United States Patent
Borne, III et al.

(10) Patent No.: US 8,230,814 B2
(45) Date of Patent: Jul. 31, 2012

(54) MECHANIZED COLLECTOR OF JUVENILE LOBSTERS

(75) Inventors: Lawrence Jules Borne, III, Vero Beach, FL (US); Benjamin Alan Metzger, Vero Beach, FL (US); Geoff William Beiser, Vero Beach, FL (US); Megan Davis, Fellsmere, FL (US)

(73) Assignee: Darden Restaurants, Inc., Orlando, FL (US)

( * ) Notice: Subject to any disclaimer, the term of this patent is extended or adjusted under 35 U.S.C. 154(b) by 262 days.

(21) Appl. No.: 12/565,327

(22) Filed: Sep. 23, 2009

(65) Prior Publication Data

US 2010/0071630 A1 Mar. 25, 2010

Related U.S. Application Data

(60) Provisional application No. 61/099,804, filed on Sep. 24, 2008.

(51) Int. Cl.
*A01K 61/00* (2006.01)
(52) U.S. Cl. .............................. 119/213; 43/4.5; 43/27.2
(58) Field of Classification Search .................. 119/213, 119/200, 201, 202, 204, 206, 207, 208, 215, 119/216, 217, 234, 236, 237, 238, 239, 240, 119/241, 223; 43/10, 6.5, 7, 8, 26.1, 27.2, 43/27.4, 42.7, 43.13, 9.1, 9.8, 9.95, 4.5, 100, 43/101, 102, 103, 104, 105, 58, 106, 60, 43/4; 114/255, 254, 26, 351, 253; 440/34; 47/59 R, 64, 1.4; 37/314, 315, 316; 414/137.1, 414/137.7, 142.8
See application file for complete search history.

(56) References Cited

U.S. PATENT DOCUMENTS

| | | | | |
|---|---|---|---|---|
| 239,592 | A * | 3/1881 | Weems | 114/26 |
| 3,672,079 | A * | 6/1972 | Masuda et al. | 37/314 |
| 3,687,418 | A | 8/1972 | Halvorsen | |
| 3,707,799 | A * | 1/1973 | Hatley | 43/8 |
| 3,722,126 | A | 3/1973 | Whipple et al. | |
| 3,903,632 | A | 9/1975 | Tison et al. | |
| 3,908,291 | A * | 9/1975 | Masuda | 37/314 |
| 3,916,832 | A | 11/1975 | Sweeney | |
| 3,964,730 | A * | 6/1976 | Demmert | 43/8 |

(Continued)

FOREIGN PATENT DOCUMENTS

JP 2004357666 12/2004
(Continued)

*Primary Examiner* — Kimberly Berona
*Assistant Examiner* — Joshua Huson
(74) *Attorney, Agent, or Firm* — Akerman Senterfitt; Michael K. Dixon

(57) ABSTRACT

A mechanized collector for collecting juvenile lobsters to be raised in a growout system is disclosed. The mechanized collector may be formed from a vessel, a longline support system capable of supporting and suspending a longline having a plurality of juvenile lobster collectors above a deck of the vessel, and a shaker assembly positioned to engage at least one of the plurality of juvenile lobster collectors suspended above the deck of the vessel and attached to the longline. The shaker assembly may be configured to shake the plurality of juvenile lobster collectors individually or collectively together, thereby causing the juvenile lobsters to fall into a collection trough positioned under the collector. The plurality of juvenile lobster collectors may be attached to the longline and formed from at least one generally flat panel that is suspended generally vertically in water above the longline with at least one float.

19 Claims, 23 Drawing Sheets

U.S. PATENT DOCUMENTS

| | | | |
|---|---|---|---|
| 4,036,176 A | | 7/1977 | McCarty et al. |
| 4,272,904 A | | 6/1981 | Francklyn |
| 4,309,837 A | * | 1/1982 | Raymond .......................... 43/8 |
| 4,347,680 A | * | 9/1982 | Kaestner .......................... 43/10 |
| 4,366,639 A | * | 1/1983 | Einarsson .......................... 43/8 |
| 4,464,851 A | * | 8/1984 | Collier .......................... 37/309 |
| 4,467,744 A | | 8/1984 | Handrus |
| 4,554,759 A | | 11/1985 | Edling et al. |
| 4,559,902 A | | 12/1985 | Mason et al. |
| 4,831,773 A | | 5/1989 | Rostrom |
| 4,896,626 A | * | 1/1990 | Holt et al. .................... 119/237 |
| 5,157,858 A | | 10/1992 | Lockner et al. |
| 5,165,174 A | | 11/1992 | Brown, Jr. |
| 5,890,311 A | * | 4/1999 | Willener et al. ................. 43/4.5 |
| 6,561,134 B1 | | 5/2003 | Mikami |
| 7,114,461 B2 | | 10/2006 | Stence, Jr. |
| 2003/0094141 A1 | | 5/2003 | Davis |
| 2008/0006214 A1 | | 1/2008 | Power |

FOREIGN PATENT DOCUMENTS

WO     2007148209     12/2007

* cited by examiner

MECHANIZED COLLECTOR OF JUVENILE LOBSTERS

CROSS-REFERENCE TO RELATED APPLICATION

This patent application claims the benefit of U.S. Provisional Patent Application No. 61/099,804, filed Sep. 24, 2008, which is incorporated by reference in its entirety.

FIELD OF THE INVENTION

This invention is directed generally to aquaculture systems, and more particularly to mechanized collection systems useful in lobster aquaculture systems.

BACKGROUND

Conventional lobster harvesting has consisted of divers harvesting lobsters and the use of traps placed on the sea floor and whose location has been marked with floats. These methods of harvesting lobsters has been useful to date, however, the ever increasing population is placing increased demands on our natural resources that are nearing or have already outpaced the available, sustainable lobster supply. One solution has been to look to new locations for harvesting lobsters. Another solution has been to raise lobsters in captivity. Raising lobsters in captivity is in its infancy.

Typically, juvenile lobsters, also referred to as seed lobsters, are captured from near shore reefs and ocean accessible shallows, such as in the channels proximate to the shallows. These seed lobsters are then contained in cages in a naturally occurring water body or on land in tanks. The seed lobsters are typically captured via a collector suspended in the water. Each collector is deployed individually and is checked individually. The collector is hauled from the water and manually shaken by hand over the deck of a boat. All lobsters that fall to the deck of the boat are collected. Wind and seas often make this a very time consuming process because the boat must maneuvered to catch the float for each collector. Currently, the process is very time consuming.

SUMMARY OF THE INVENTION

This invention is directed to a mechanized collector for collecting juvenile lobsters to be raised in a growout system. The mechanized collector may be formed from a vessel, a longline support system capable of supporting and suspending a longline having a plurality of juvenile lobster collectors above a deck of the vessel, and a shaker assembly positioned to engage at least one of the plurality of juvenile lobster collectors suspended above the deck of the vessel, which may include one or more marine propulsion systems, such as, but not limited to, outboard, marine engines for propelling the vessel, and attached to the longline. The mechanized collector may be configured to engage the juvenile lobster collectors one at a time and shake each collector individually above a collection trough. The shaker assembly may be configured to shake the plurality of juvenile lobster collectors, thereby causing the juvenile lobsters hiding in the juvenile lobster collectors to fall out for collection. The plurality of juvenile lobster collectors may be attached to the longline at spaced intervals and formed from at least one generally flat panel that is suspended generally vertically in water above the longline with at least one float. The juvenile lobster collectors are not limited to this configuration, but may have other appropriate configurations. The components of the mechanized collector may be formed from materials, such as, but not limited to, stainless steel, aluminum and other noncorrosive materials.

The mechanized collector may include a drive system having a plurality of drive sheaves for moving the vessel relative to the longline. The drive system may include a hydraulic power unit for driving the drive sheave and other components. The mechanized collector may also include a hydraulic control console that includes a shake control for controlling reciprocating shaking by the shaker assembly, a clamp control for controlling clamping of a juvenile lobster collector, and a longline haul control for controlling a motor coupled to a drive sheave. The longline support system may include a bow longline guide for redirecting the longline from a position at a water surface to a first front sheave positioned above the deck of the vessel. The first front sheave may be positioned on a frame proximate to a bow recess or in another appropriate location. The longline support system may also include a rear longline guide positioned below the drive sheave and may be positioned proximate to a transom recess for directing the longline back into the water.

The juvenile lobster collector may be formed from at least one panel attached to the longline. The at least one panel may be formed from a generally flat panel suspended generally vertically in water above the longline with at least one float. The juvenile lobster collector may have any appropriate configuration.

The longline support system may be formed from a front sheave assembly positioned forward on the vessel relative to the shaker assembly, an adjustable sheave tree assembly positioned above the shaker assembly, and a hauler assembly positioned aft of the shaker assembly. The front sheave assembly may be formed from a sheave supported above the deck of the vessel by a frame, a bridle guide rail attached to the frame and extending laterally from the frame past a longitudinal axis of the longline support system to deflect the juvenile lobster collectors out of the longitudinal axis of the longline support system so as to prevent fouling of juvenile lobster collectors bridles with the sheave, and a sheave keeper positioned proximate to the sheave to prevent the longline from being displaced from the sheave. The adjustable sheave tree assembly may be formed from a support frame having a forward sheave and an aft sheave that are generally aligned, and a sheave tree bridle guide rail attached to the support frame and extending laterally from the support frame past a longitudinal axis of the longline support system to deflect the juvenile lobster collectors out of the longitudinal axis of the longline support system so as to prevent fouling of juvenile lobster collector bridles with the forward and aft sheaves. The support frame may be adjustably coupled to the shaker assembly such that the distance of the forward and aft shaves from the deck of the vessel may be varied. The hauler assembly may include a drive sheave supported above the deck of the vessel by a hauler frame, a motor with a brake coupled to the sheave, a hauler bridle guard rail attached to the hauler frame and extending laterally from the support frame past a longitudinal axis of the longline support system to deflect the juvenile lobster collectors out of the longitudinal axis of the longline support system so as to prevent fouling of juvenile lobster collector bridles with the drive sheave, and a rear longline guide extending from proximate the drive sheave to a location proximate to the deck of the vessel.

A bow guide rail may extend from the front sheave assembly to the shaker assembly to guide the juvenile lobster collectors. The bow guide rail may be generally aligned with a longitudinal axis of the longline support system. A bow longline guide may be positioned at the bow of the vessel and configured to guide the longline onto the front sheave. The bow longline guide may be formed from a rotatable boom that rotates open to provide an opening to the juvenile lobster collector basin at the bow of the vessel, wherein the rotatable boom is positioned forward of the front sheave and includes a chute forming a longline containment channel extending from proximate a water surface and curving upwardly toward the shaker assembly. The chute may be formed from at least one deflection panel forming transition sides that are positioned at oblique angles relative to each other. The mechanized collector may include a guide system configured to guide the bridles attaching the juvenile lobster collectors onto the longline laterally away from the longline positioned in the longline support system such that the bridles are not pulled through sheaves of the longline support system.

The shaker assembly may be formed from at least one clamp bar slideably coupled to a clamp frame such that a least one stud protruding from a side of the clamp bar is positioned within a slot in the clamp frame, wherein the slot is formed from a first engaging section that is positioned generally oblique to the deck of the vessel and a second engaged section that is positioned generally vertically such that when the clamp bar engages one of the juvenile lobster collectors. The stud slides from an first end of the first engaging section to an intersection of the first engaging section and the second engaging section, thereby engaging the juvenile lobster collector, and moving from the intersection to a second end of the second engaging section thereby moving the juvenile lobster collector vertically and alleviating weight from a bridle securing the juvenile lobster collector to the longline. The shaker assembly may include two opposing clamp frames slideably attached to generally vertically positioned shafts and at least one clamp bar attached to each of the clamp frames such that stud protruding from a side of the at least one clamp bar is positioned within a slot in the clamp frame enabling the clamp bar to move relative to the clamp frame.

Each of the clamp frames may be coupled to a drive shaft through a yoke positioned beneath a collection trough and a cam to create a generally vertical reciprocating motion. A collection trough may be positioned under at least a portion of the shaker assembly to collect lobsters falling from the juvenile lobster collectors, and a collection screen may be positioned over a drainage pan positioned at a downstream end of the collection trough. The trough may include a center recess housing drive shaft components, wherein the center recess is covered with a recess cover that is coupled to a yoke to prevent water and particles from falling out of the trough.

The mechanized collector may be used within a method of raising lobsters for human consumption. In particular, the method may include collecting juvenile lobsters using a mechanized collector as previously described. The mechanized collector may be operated to collect juvenile lobsters by first attaching the longline to the longline support system. The longline may be fed through the first lower pulley, the first idler sheave, the drive sheave, and the second lower pulley. The hydraulic power unit may be activated to rotate the drive sheave to pull a juvenile lobster collector from the water. When in the water, the longline rests below the juvenile lobster collector. The juvenile lobster collector rises above the longline and is suspended beneath the float. As the juvenile lobster collector is raised from the water, the juvenile lobster collector is suspended below the longline. Once the juvenile lobster collector is moved into the shaker assembly, the drive sheave is stopped.

The shaker assembly operates by first and second clamp frames moving toward each other and contacting the juvenile lobster collector therebetween. The first and second clamp frames may move along the first and second slots to engage the juvenile lobster collector. The first and second clamp frames may then move upward along the slides a distance, such as about two to five inches, sufficient to relieve tension from the rope attaching the juvenile lobster collector to the longline. The crankshaft may then be rotated to create a reciprocating motion of the juvenile lobster collector at a rate sufficient to shake the juvenile lobsters from the juvenile lobster collectors. The first and second clamp frames may then be retracted and the longline may be advanced until the next juvenile lobster collector is positioned within the shaker assembly. The juvenile lobsters may be collected from a collection trough positioned below the collector and deposited in a holding tank or other such device on the vessel. This method may be repeated for each of the juvenile lobster collectors that are attached to the longline. The hydraulic power unit and the drive sheave may pull the vessel along the longline while the longline remains attached to the bottom. The system may be controlled manually by actuating each component or, in other embodiments, by automation of portions or all of the system.

The lobsters that are collected from the juvenile lobster collectors may be placed into a growout system. The growout system may be any appropriate device, such as, but not limited to, a growout system in a naturally occurring water body, such as sea cages, or in a tank on land, such as inland growout systems. The lobsters may be retained in the growout system until the lobsters reach a harvestable size. The lobsters may be grown using any appropriate method. The lobsters may then be harvested and shipped to their final destination to be prepared for consumption.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
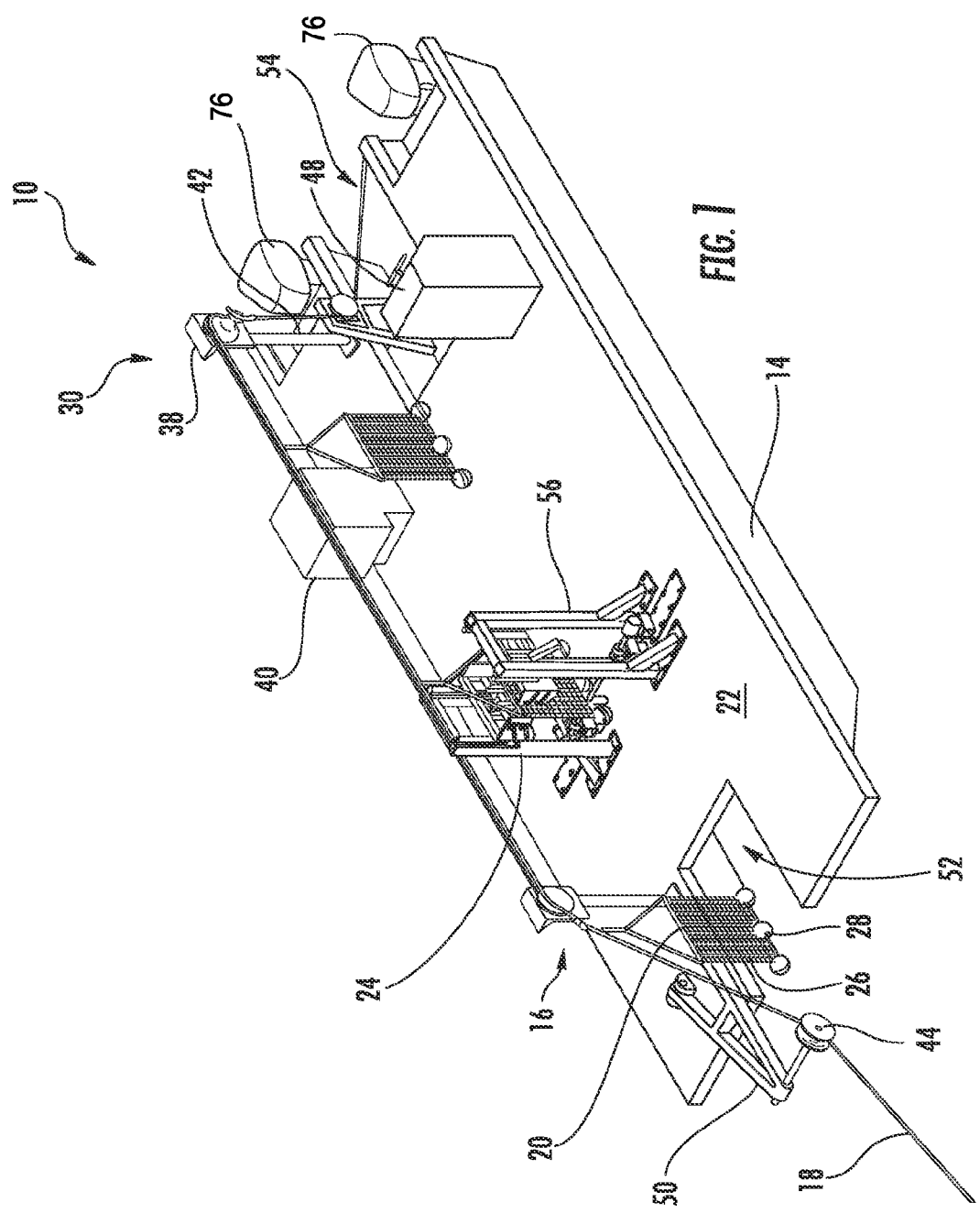
FIG. 1 is a perspective view of the mechanized collector.
Figure 2:
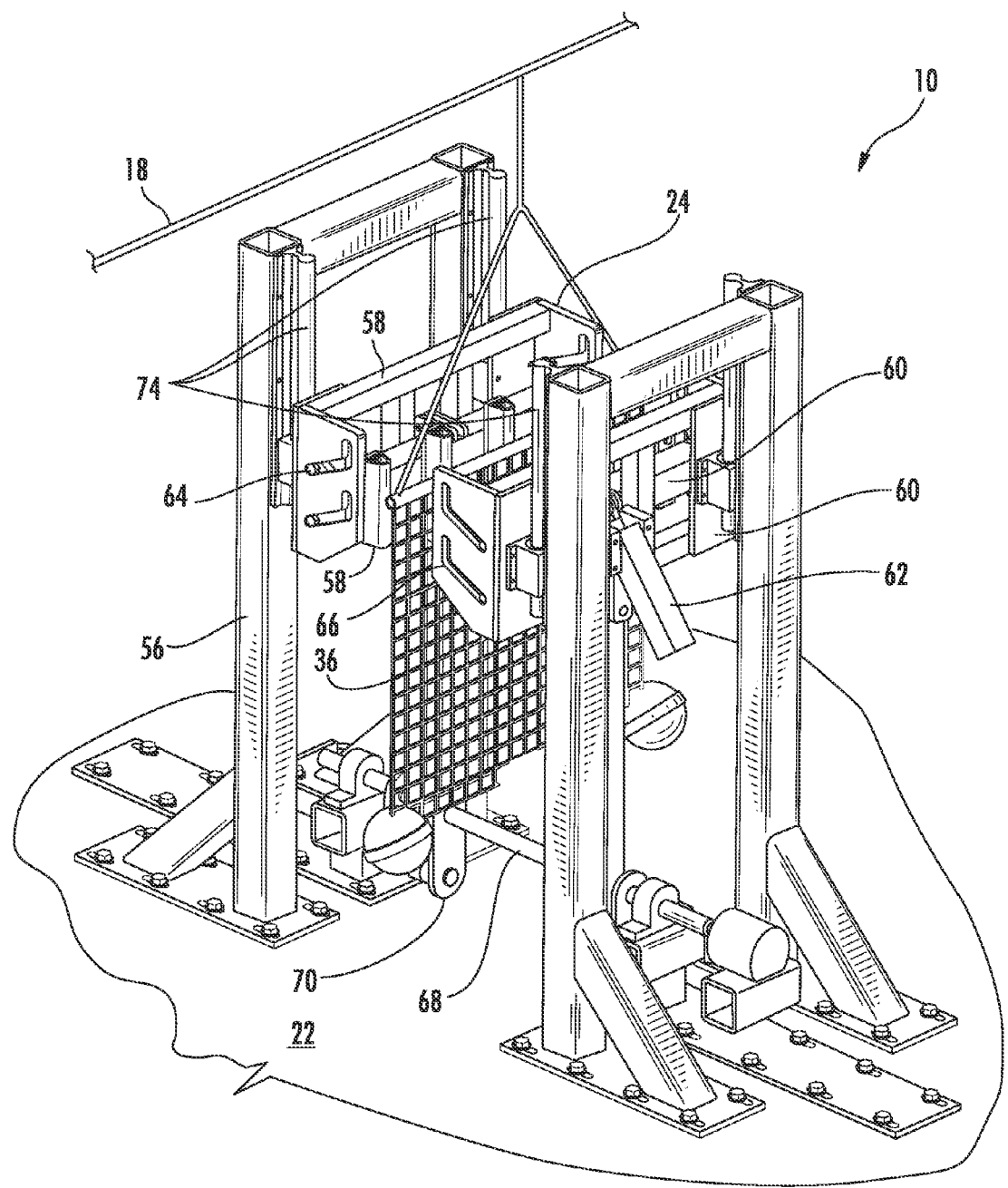
FIG. 2 is a perspective view of the shaker assembly shown in FIG. 1.

As shown in FIGS. 1-23, this invention is directed to a mechanized collector 10 for collecting juvenile lobsters to be raised in a growout system 12. The mechanized collector 10 may be formed from a floating vessel 14, a longline support system 16 capable of supporting and suspending a longline 18 having a plurality of juvenile lobster collectors 20 above a deck 22 of the vessel 14, and a shaker assembly 24 positioned to engage at least one of the plurality of juvenile lobster collectors 20 suspended above the deck 22 of the vessel 14 and attached to the longline 18. The mechanized collector 10 may be configured to engage the juvenile lobster collectors 20 one at a time and shake each collector individually above a collection trough 25. The shaker assembly 24, as shown in FIGS. 2-5, may be configured to shake the plurality of juvenile lobster collectors 20, thereby causing the juvenile lobsters hiding in the juvenile lobster collectors 20 to fall out for collection. The plurality of juvenile lobster collectors 20 may be attached to the longline 18 at spaced intervals and formed from at least one generally flat panel 26 that is suspended generally vertically in water above the longline 18 with at least one float 28. The juvenile lobster collectors 20 are not limited to this configuration, but may have other appropriate configurations. The components of the mechanized collector 10 may be formed from materials, such as, but not limited to, stainless steel, aluminum and other noncorrosive materials.

Figure 17:
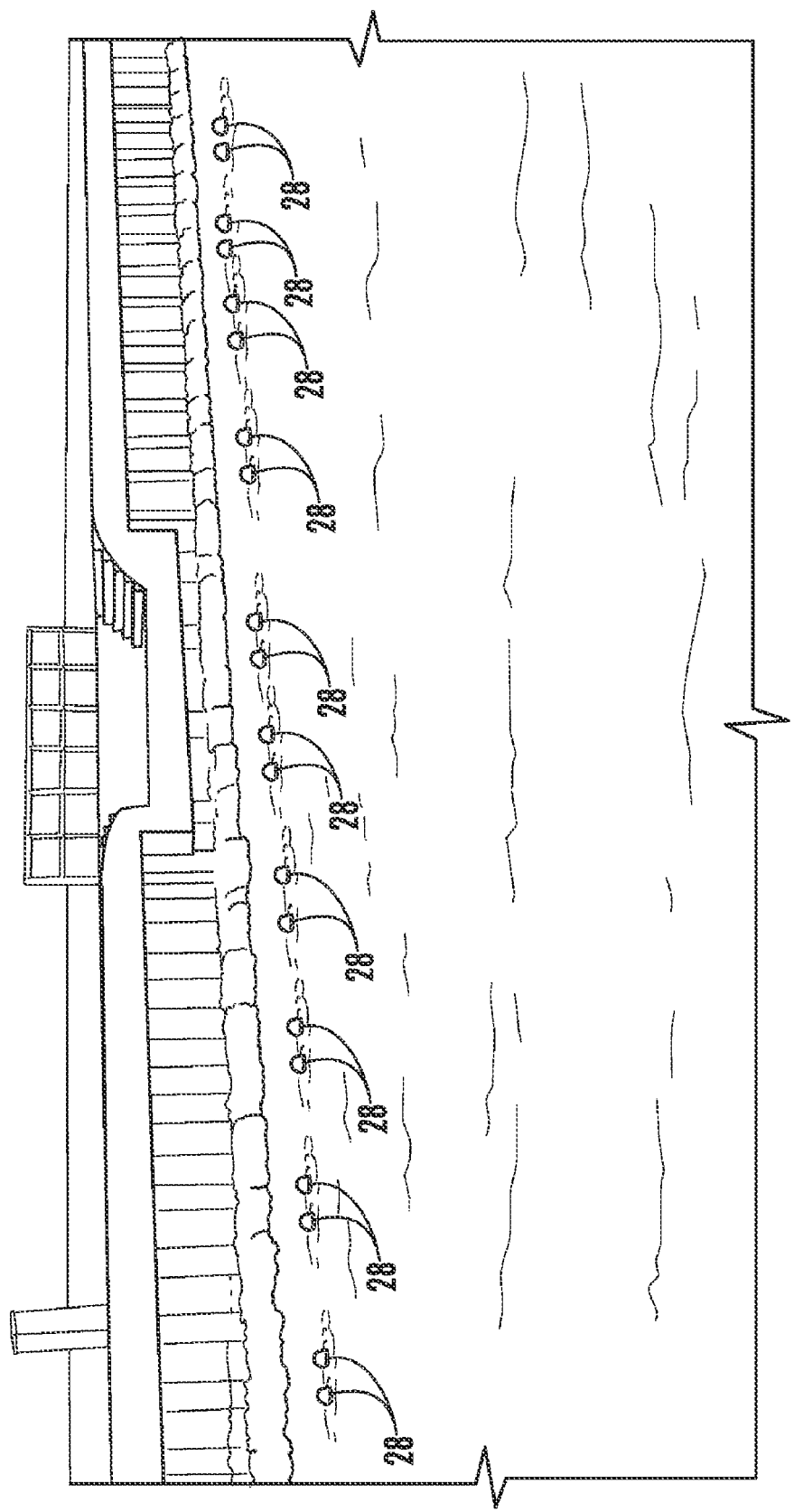
FIG. 17 is a perspective view of a longline positioned in a water body with collectors floating above the longline and suspended via the floats.
Figure 18:
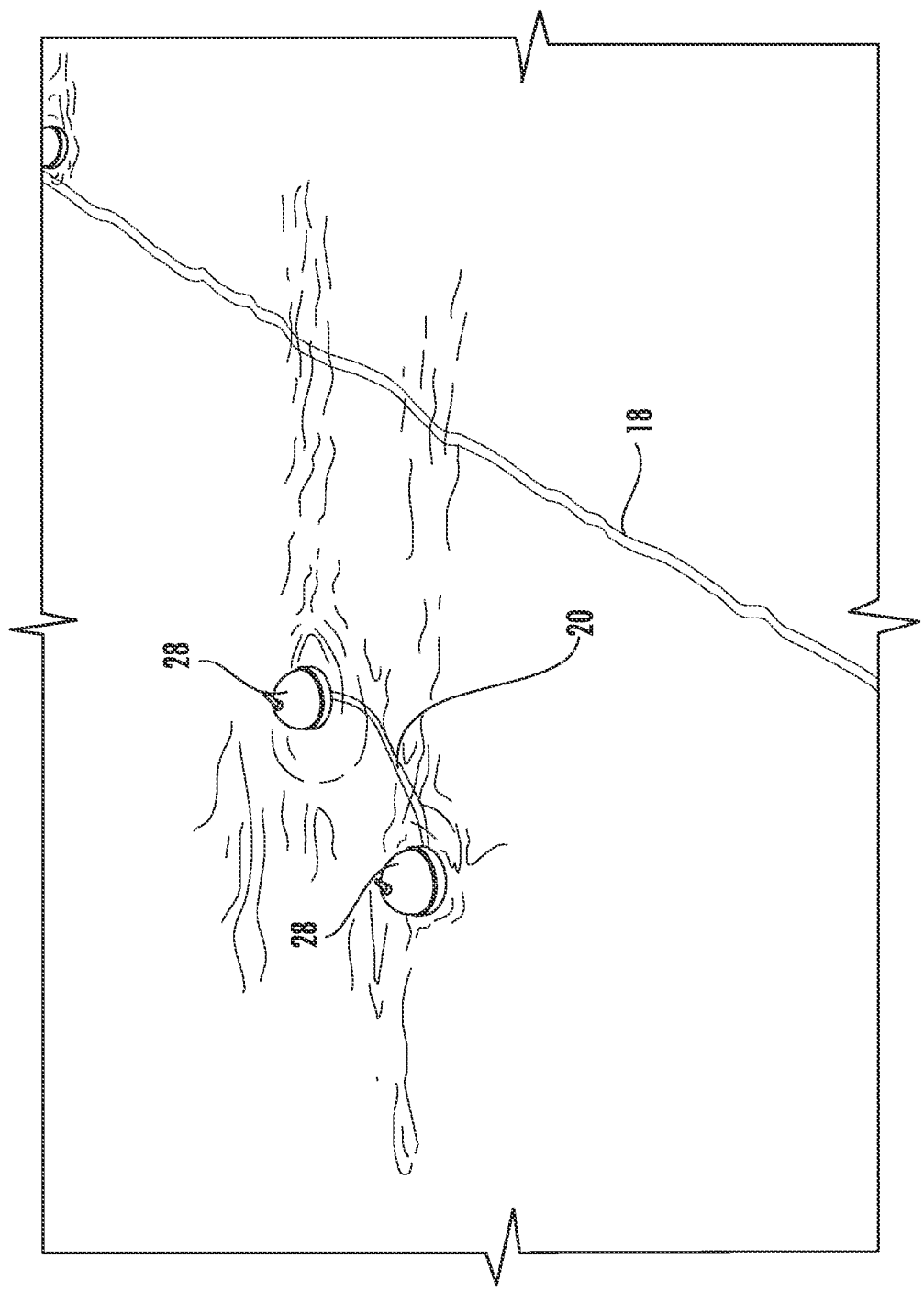
FIG. 18 is a perspective view of a portion of a longline with the longline being raised in the water column to a position near the surface and a collector attached to the longline and floating nearby.
Figure 19:
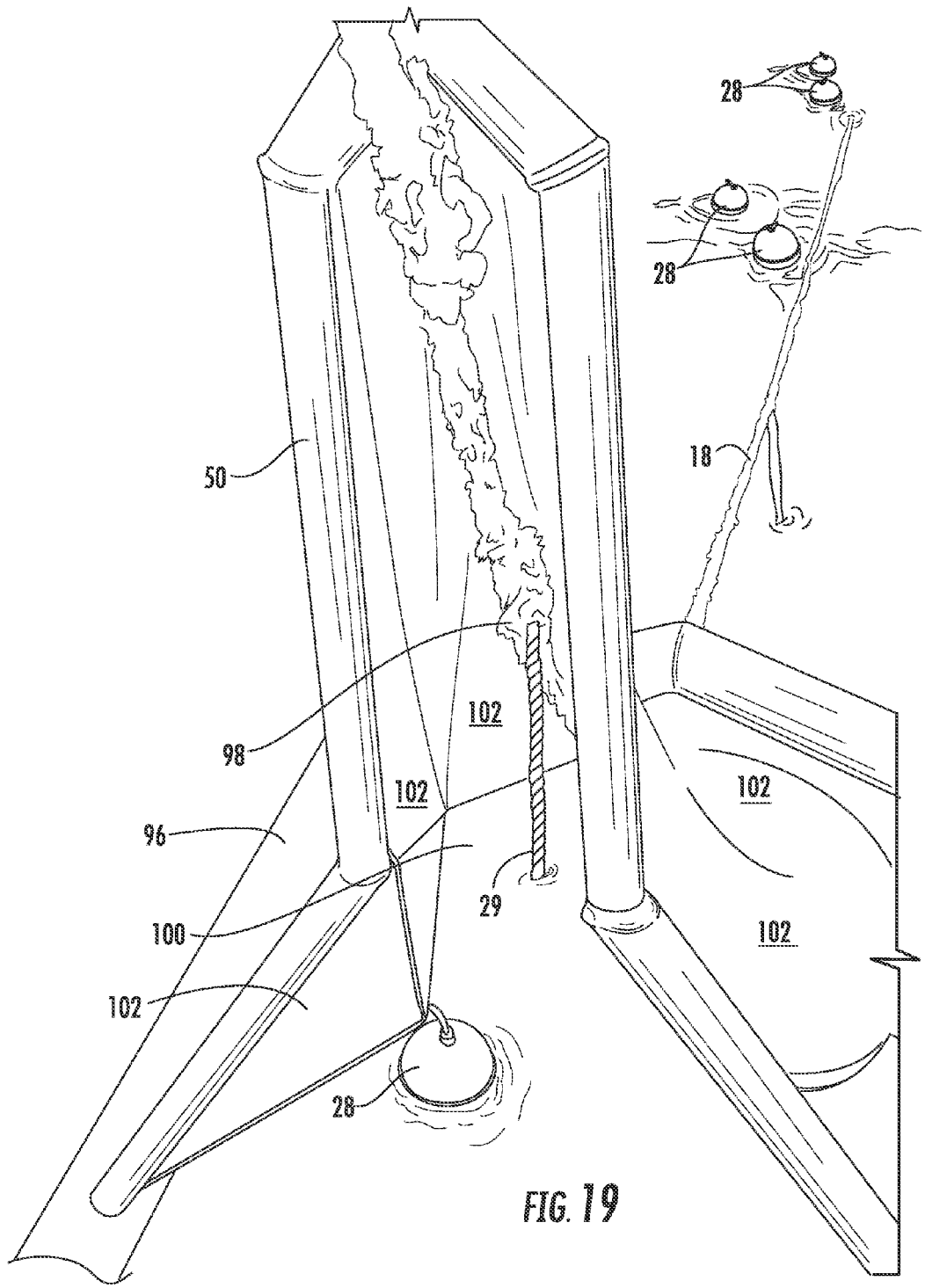
FIG. 19 is a perspective view of the bow boom rotated in a closed positioned and a longline being guided onto the longline support system on the vessel with a longline positioned in the chute.

The mechanized collector 10 may be configured to cooperate with the longline 18, such as shown in FIGS. 17-19, such that when the vessel 14 is collecting juvenile lobsters from the juvenile lobster collectors 20, a drive system 30 on the vessel 14 may be used to pull the vessel 14 along the longline 18. The longline 18 may be a line with a long length that is attached at each end to the seabed with dead weights, permanent anchors, removable anchors, or another appropriate method. The longline 18 may be any appropriate length, such as, but not limited to, between about 400 feet and 3,000 feet and may be about 500 feet in one embodiment. In other embodiments, the longline 18 may be shorter or longer than the lengths in this range. The longline 18 may be formed from cable, such as metal strand cable, rope, or any other appropriate material.

Figure 3:
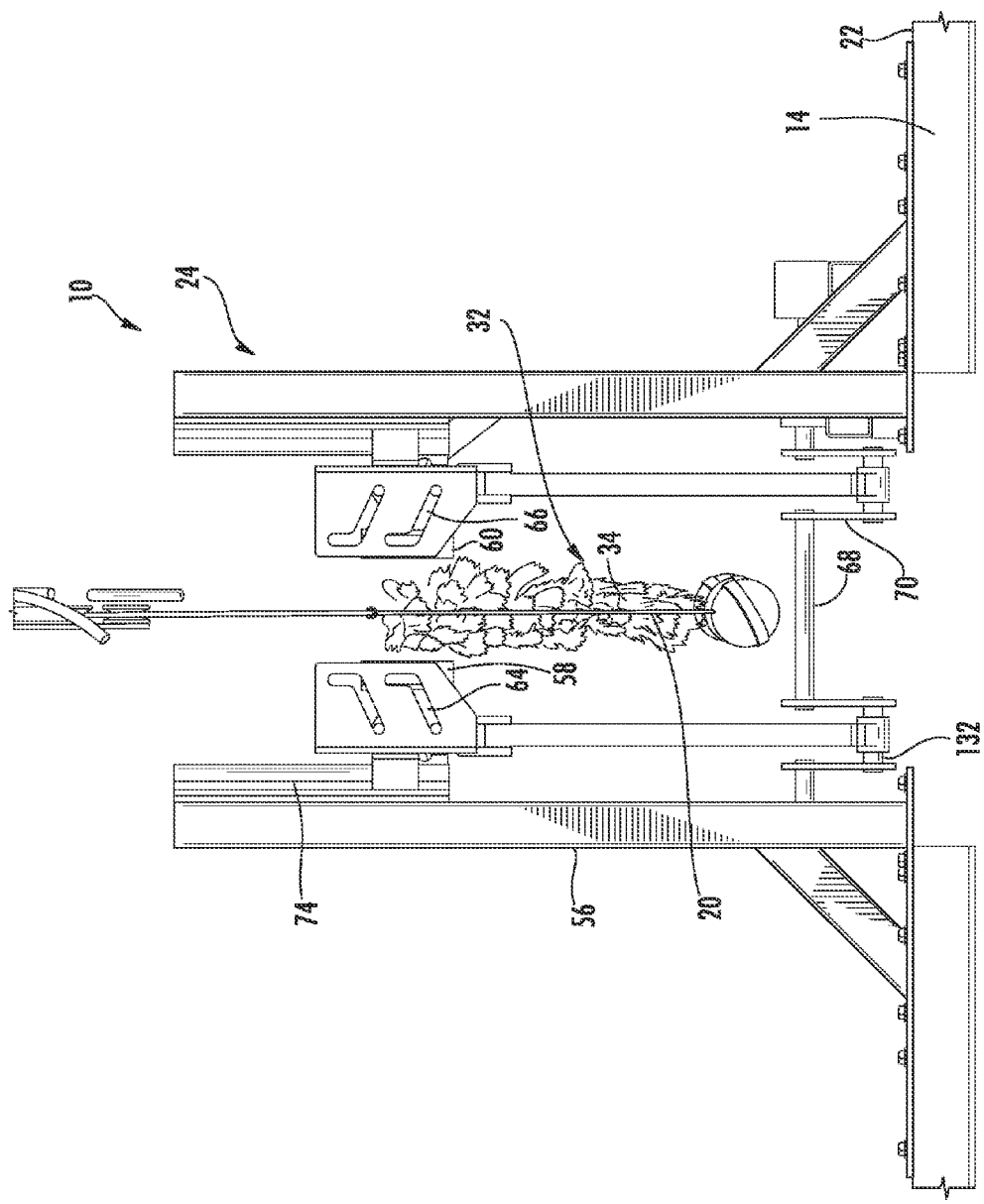
FIG. 3 is a front view of the shaker assembly shown in FIG. 2.
Figure 20:
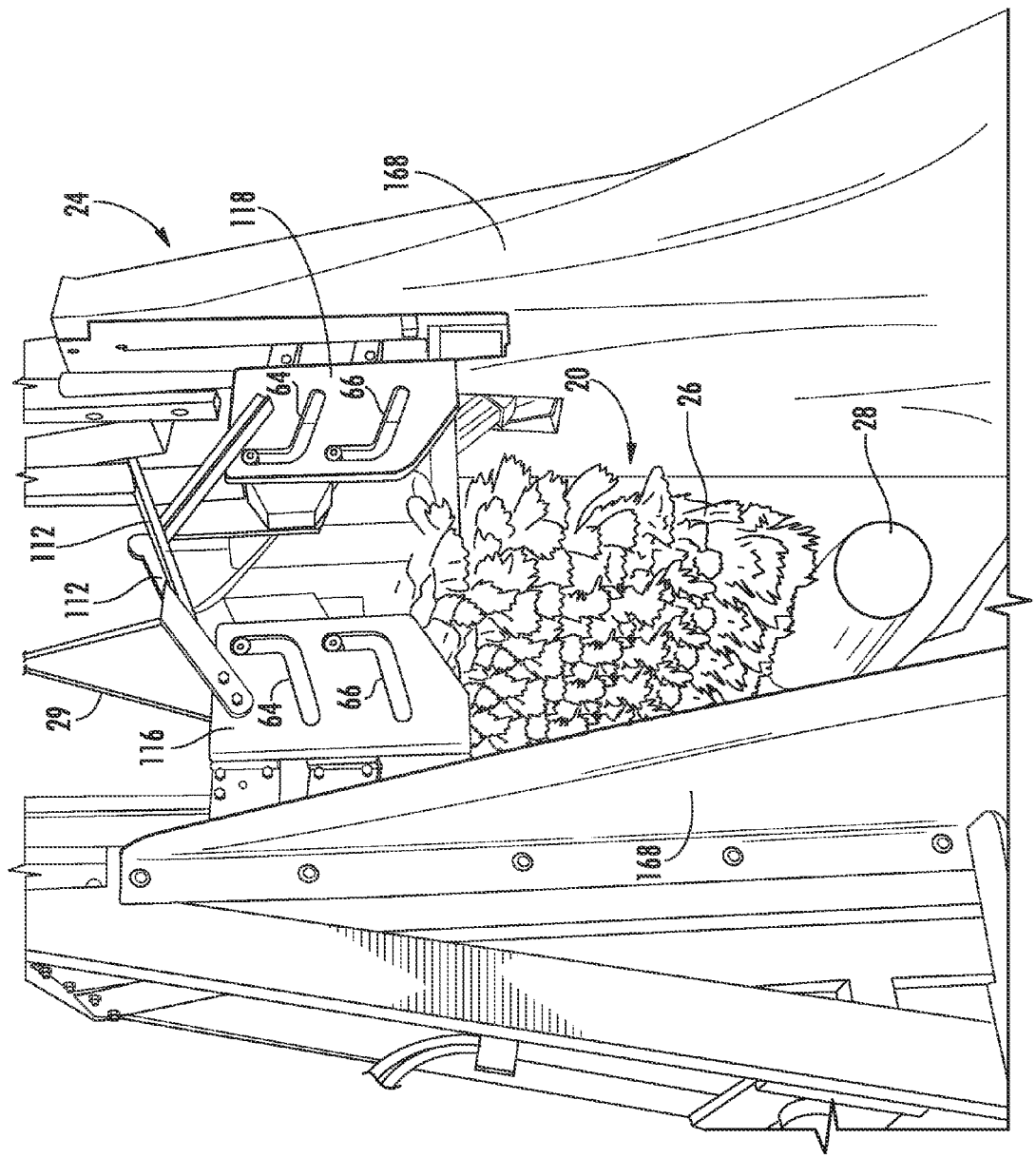
FIG. 20 is a perspective view of a collector suspended in the shaker assembly with the clamp bars and clamp frame, wherein the clamp frames is reciprocating generally vertically to shake juvenile lobsters from the collector.

The juvenile lobster collectors 20, as shown in FIGS. 3, 18 and 20, may be attached to the longline 18 such that the juvenile lobster collectors 20 may be suspended above the longline 18 with any appropriate number of floats 28. The floats 28 may be attached to one side of the juvenile lobster collectors 20, and bridles 29 may be attached to an opposite side of the juvenile lobster collectors 20. The bridles 29 may be attached to the longlines 18 and to the juvenile lobster collectors 20. The juvenile lobster collectors 20 may be spaced from each other a distance, such as, but not limited to, between one foot and 30 feet. In at least one embodiment, the juvenile lobster collectors 20 may be spaced from each other between about one foot and three feet. As an example, a longline 18 having a length of 500 feet may have between 90 and 140 juvenile lobster collectors 20 attached thereto.

The juvenile lobster collectors 20 may be any appropriate configuration. In at least one embodiment, as shown in FIG. 3, the juvenile lobster collectors 20 may be formed from a panel 26, such as, but not limited to, a generally flat panel 26. The panel 26 may include habitat forming structures 32 extending from the panel 26. The habitat forming structures 32 may be, but are not limited to being, pieces of rope 34 extending from the panel 26 about four to eight inches. The rope 34 may be formed from materials, such as, but not limited to, polypropylene, manila, and other appropriate materials. The rope 34 may be attached to a flat piece of mesh 36 having sufficient rigidity to maintain its shape. The rope 34 may be unraveled to increase the surface area to which marine fouling may attach. In one embodiment, the juvenile lobster collectors 20 may be about 31 inches by 31 inches and weigh approximately 100 pounds when wet and loaded with marine fouling. The juvenile lobster collectors 20 may have other sizes and shapes as well. The juvenile lobster collectors 20 are shown in use in FIGS. 17 and 18.

As shown in FIG. 1, the vessel 14 may be any vessel 14 capable of supporting the components of the mechanized collector 10 and provide sufficient room for personnel to work on the deck 22 of the vessel 14. The vessel 14 may provide a stable structure upon which the components of the mechanized collector 10 may be attached. In at least one embodiment, the vessel 14 may be a catamaran hull for stability having a length between about 20 feet and about 40 feet and may be powered by mechanical propulsion, such as, but not limited to, one or more outboard marine engines 76. As shown in FIG. 1, the vessel 14 may be powered by twin outboard marine engines 76.

The mechanized collector 10 may also include a longline support system 16 capable of supporting and suspending the longline 18 having a plurality of juvenile lobster collectors 20 above the deck 22 of the vessel 14. The longline support system 16 may include a drive system 30 for moving the vessel 14 along the longline 18. The drive system 30 may include a front sheave assembly 78, an adjustable sheave tree 80 and a hauler assembly 82. The front sheave assembly 78 may be configured to support and guide the longline 18 from the water to a position above the deck 22 of the vessel 14. The adjustable sheave tree 80 may be positioned directly above the shaker assembly 24 and aft of the front sheave assembly 78. The adjustability of the sheave tree 80 enables the mechanized collector 10 to account for different lengths in the bridle 29 so that each juvenile lobster collector 20 may be properly positioned in the shaker assembly 24. The hauler assembly 82 may be positioned aft of the adjustable sheave tree 80 and may include one or more drive sheaves 38.

Figure 23:
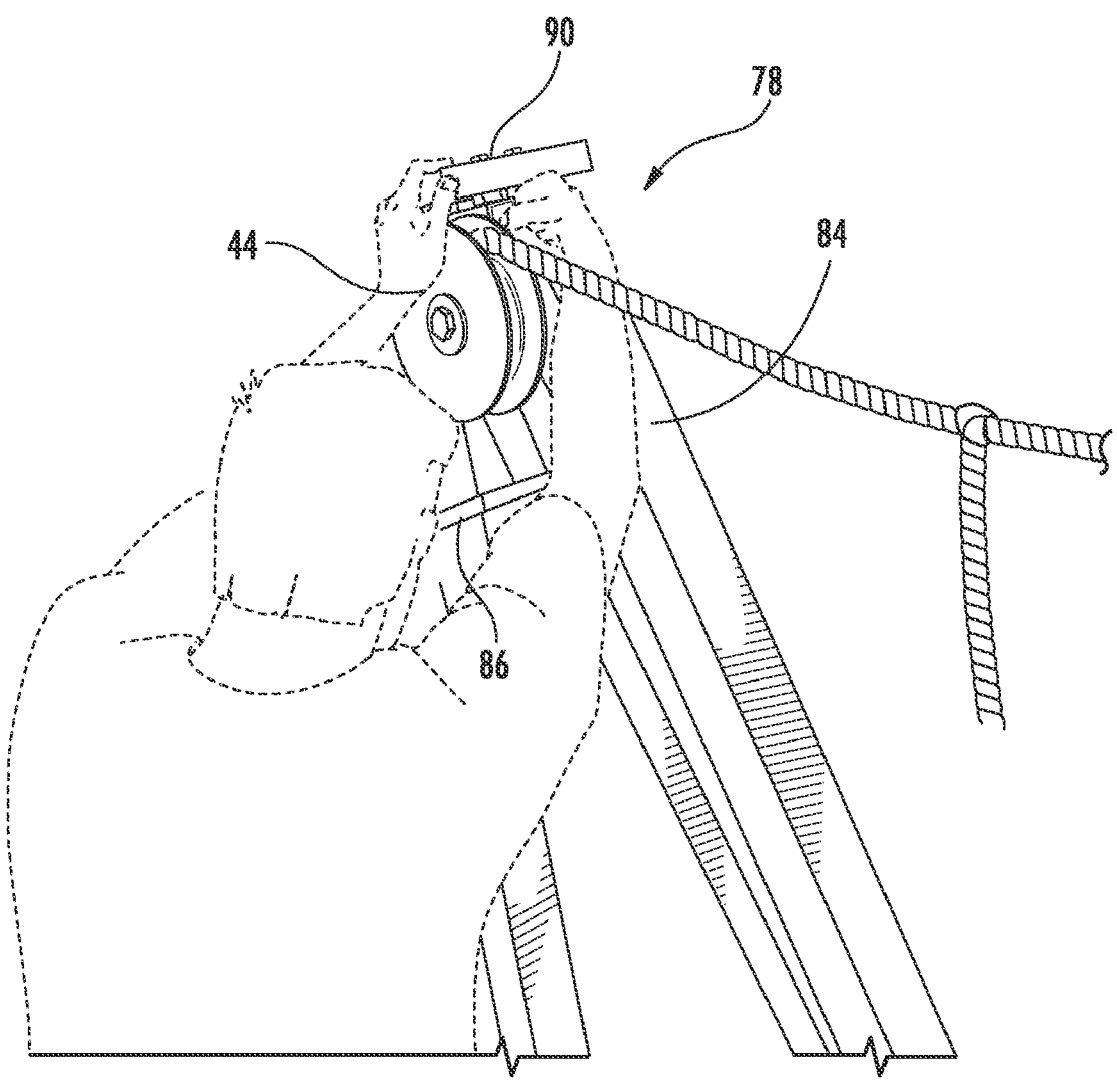
FIG. 23 is a perspective view of a front sheave assembly with the longline suspended from a sheave in the front sheave assembly.

The front sheave assembly 78, as shown in FIG. 23, may be formed from a first, front sheave 44 supported above the deck 22 of the vessel 14 by a frame 84, a bridle guide rail 86 attached to the frame 84 and extending laterally from the frame 84 past a longitudinal axis 88 of the longline support system 16 to deflect the juvenile lobster collectors out of the longitudinal axis 88 of the longline support system 16 so as to prevent fouling of juvenile lobster collectors bridles 29 with the first, front sheave 44, and a sheave keeper 90 positioned proximate to the first, front sheave 44 to prevent the longline 18 from being displaced from the first, front sheave 44. The sheave keeper 90 may be formed from an elongated member pivotably or slideably attached and capable of being locked into an open or closed position such as via a pin. The first front sheave 44 may have any appropriate size.

Figure 7:
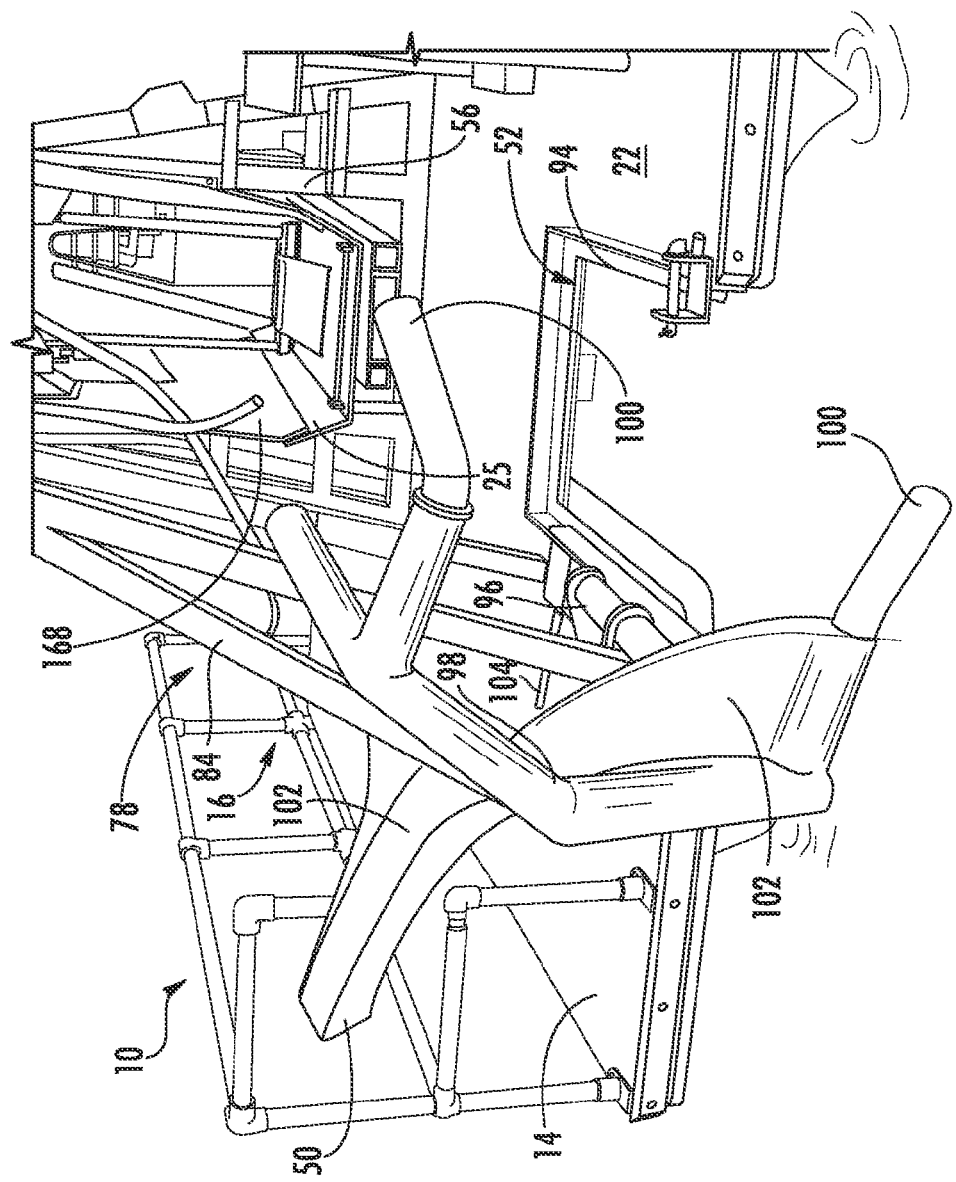
FIG. 7 is a perspective view of the bow longline guide.

A bow longline guide 50 may be positioned at the bow of the vessel 14 and may be configured to guide the longline 18 onto the first, front sheave 44. The bow longline guide 50 may be formed from a rotatable boom 96 that rotates open to provide an opening 52 to the juvenile lobster collector basin 94 at the bow of the vessel 14, as shown in FIG. 7. The rotatable boom 96 may be positioned forward of the first, front sheave 44 and may include a chute 98 forming a longline containment channel 100 extending from proximate a water surface and curving upwardly toward the shaker assembly 24. The chute 98 may be formed from one or more deflection panels 102 forming transition sides that are positioned at oblique angles relative to each other. The bow longline guide 50 may be rotated between open and closed positions using a handle bar 104.

The adjustable sheave tree 80, as shown in FIGS. 8-11, may be formed from a support frame 106 having a forward sheave 108 and a aft sheave 110 that are generally aligned to support the longline 18. The sheaves 108, 110 rotate when the longline move along its length relative to the vessel 14. The adjustable sheave tree 80 may include a sheave tree bridle guide rail 112 attached to the support frame 106 and extending laterally from the support frame 106 past the longitudinal axis 88 of the longline support system 16 to deflect the juvenile lobster collectors 20 out of the longitudinal axis 88 of the longline support system 16 so as to prevent fouling of juvenile lobster collector bridles 29 with the forward and aft sheaves 108, 110. The support frame 106 may be adjustably coupled to the shaker assembly 24 such that the distance of the forward and aft sheaves 108, 110 from the deck 22 of the vessel 14 may be varied. Varying the distance enables the shaker assembly 24 to accommodate different bridle lengths used to attached the collectors 20 to the longline 18. The adjustable sheave tree 80 may be releasably attached to the shaker assembly 24 with a plurality of bolts positioned in holes in support arms. The bolts may be removed and the adjustable sheave tree 80 may be moved up or down to change the distance between the forward and aft sheaves 108, 110 and the shaker assembly 24. In another embodiment, the adjustable sheave tree 80 may be movable with a hydraulic system. The distance between the adjustable sheave tree 80 and the shaker assembly 24 may be adjusted using a hydraulic system that enables the system to be controlled and easily changed during use of the mechanized system 10 with a single control.

Figure 8:
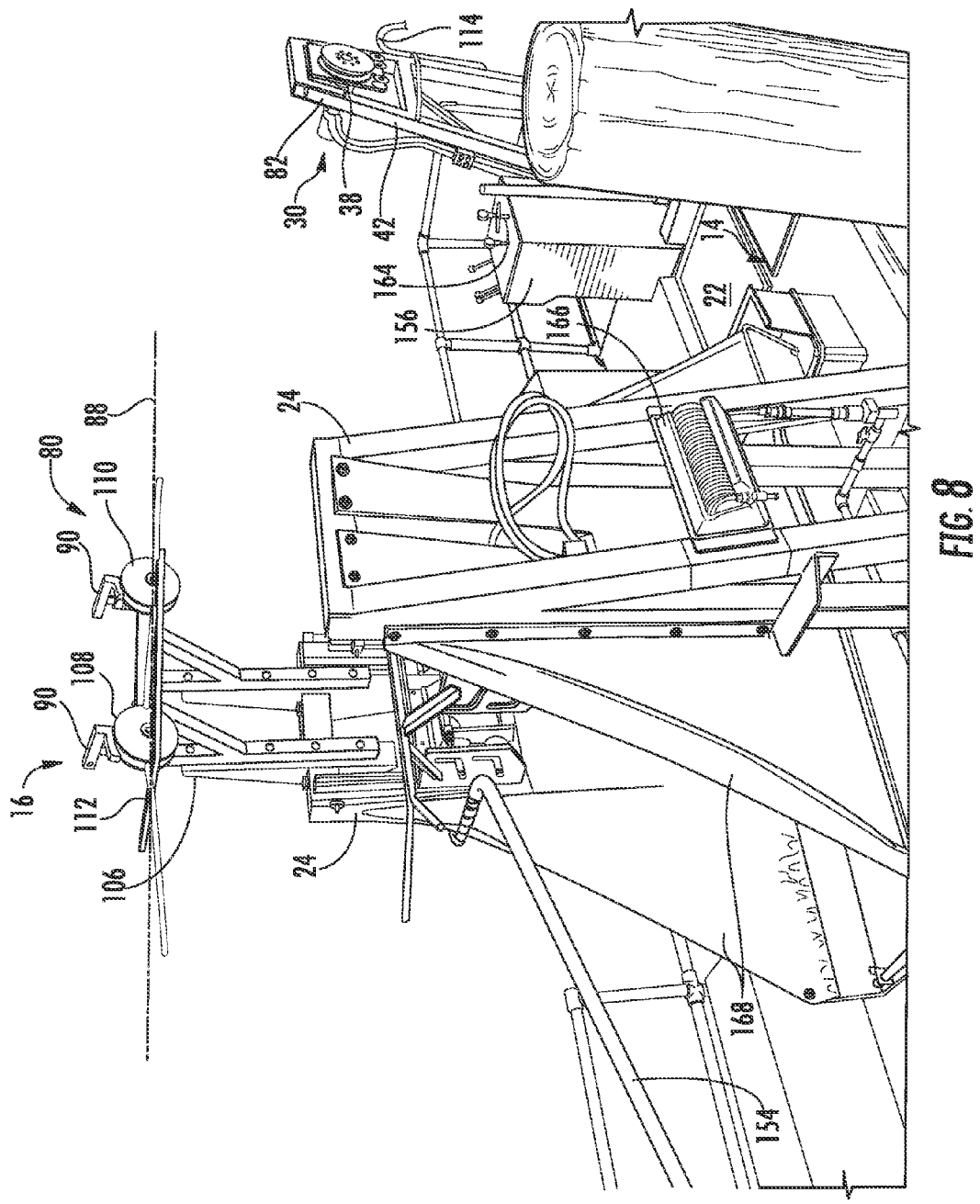
FIG. 8 is a perspective view of the adjustable sheave tree and the shaker assembly.
Figure 9:
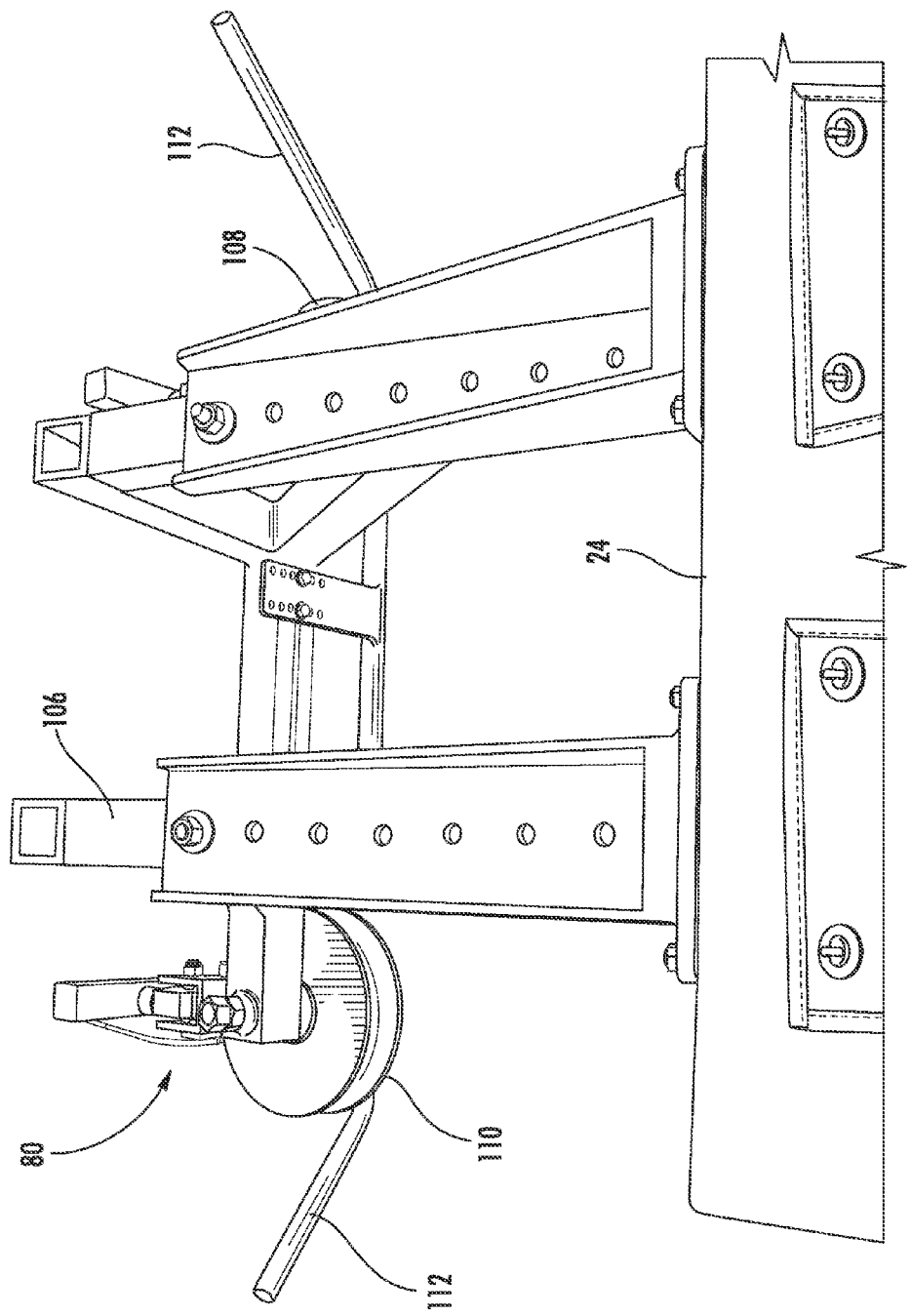
FIG. 9 is another perspective view of the adjustable sheave tree.
Figure 14:
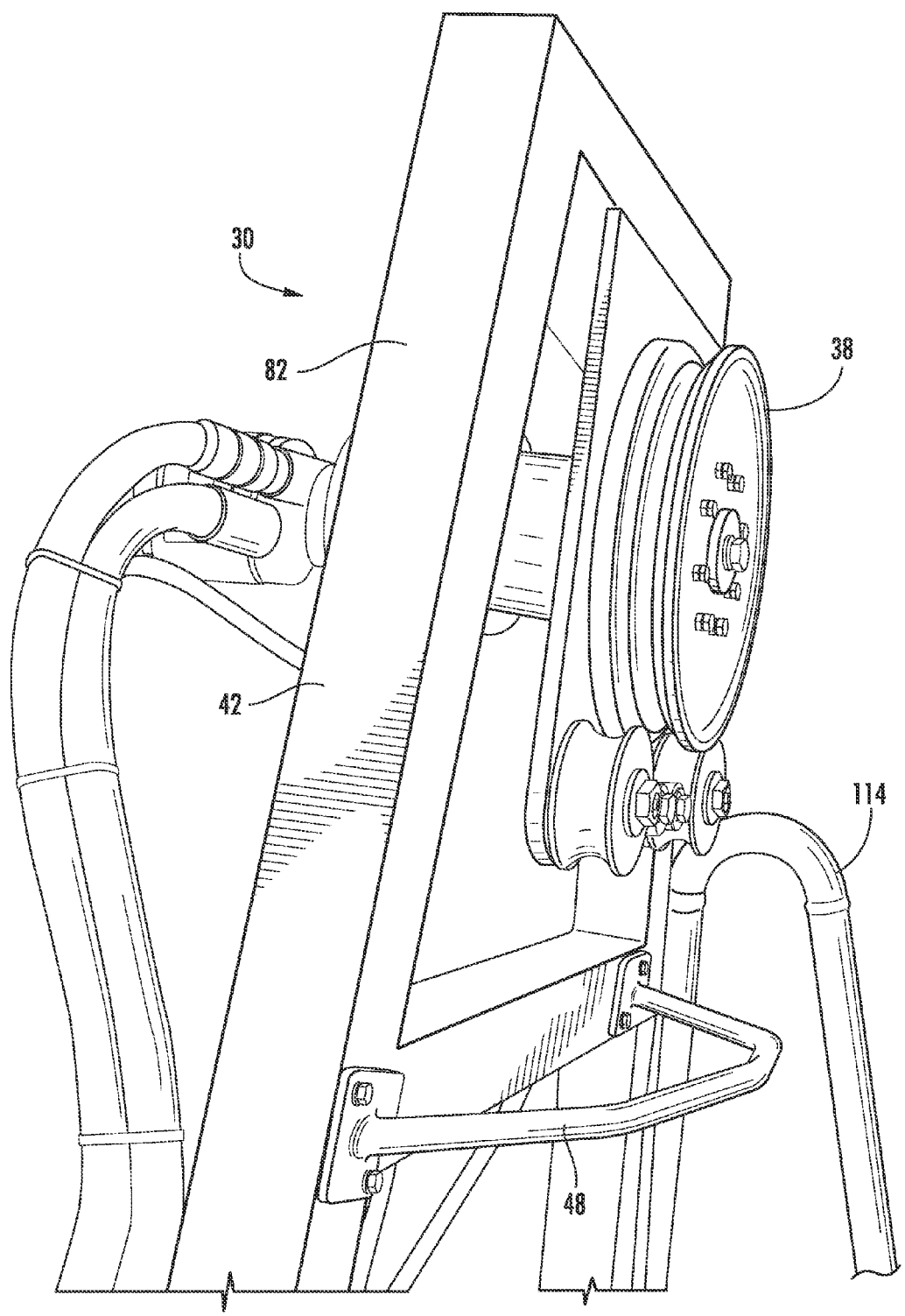
FIG. 14 is a perspective view of the hauler assembly.
Figure 15:
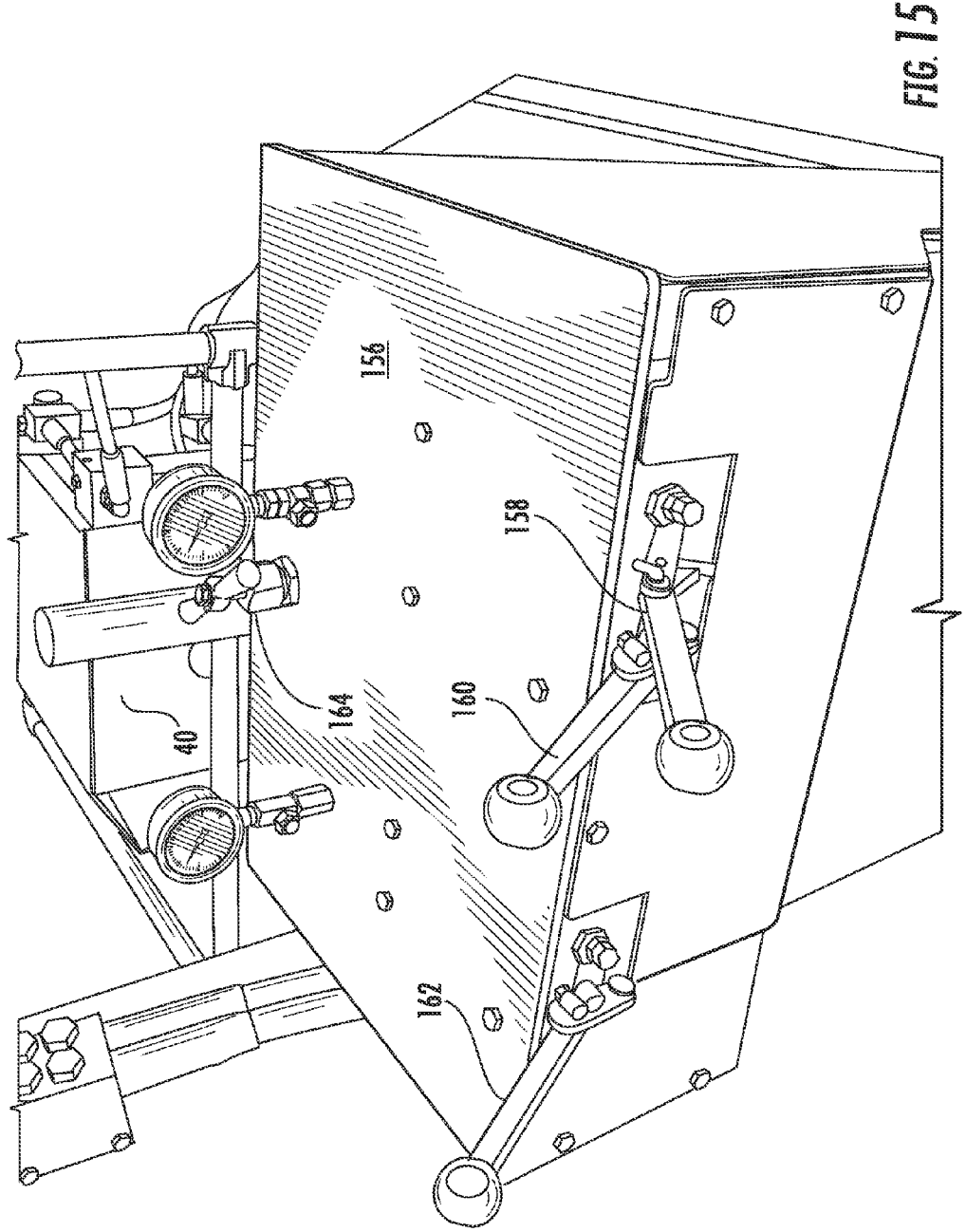
FIG. 15 is a perspective view of a control station.

The hauler assembly 82, as shown in FIGS. 8 and 14, may include a drive sheave 38 formed, in part, from a pulley sized to match the longline 18. The drive sheave 38 may be driven by any appropriate power source. For example, the drive sheave 38 may be powered by a hydraulic power unit 40 attached to a hydraulic motor that rotates the drive sheave 38. The drive sheave 38 may be supported above the deck 22 of the vessel 14 with any appropriately configured support frame 42. The longline support system 16 may also include a hauler bridle guard rail 48 positioned below the drive sheave 38. The first front sheave 44 may be positioned on a bow longline guide 50 proximate to a bow recess 52, and the hauler bridle guard rail 48 may be positioned proximate to a transom recess 54. In this arrangement, a juvenile lobster collector 20 attached to the longline 18 first passes the first front sheave 44, then passes the adjustable sheave tree 80, passes the drive sheave 38, and then passes the hauler bridle guard rail 48. The bow and transom recesses 52, 54 may have any appropriate configuration.

In at least one embodiment, the hauler assembly 82, as shown in FIG. 14, may include a drive sheave 38 supported above the deck 22 of the vessel 14 by a hauler frame 42, a motor with a brake coupled to the sheave 38, a hauler bridle guard rail 48 attached to the hauler frame 42 and extending laterally from the hauler frame 42 past the longitudinal axis 88 of the longline support system 16 to deflect the juvenile lobster collectors 20 out of alignment with the longitudinal axis 88 of the longline support system 16 so as to prevent fouling of juvenile lobster collector bridles 29 with the drive sheave 38, and a rear longline guide 114 extending from proximate the drive sheave 38 toward the deck 22 of the vessel 14. The rear longline guide 114 may have any appropriate shape and configuration, and in at least one embodiment, may be formed from a U-shaped rail extending from a position proximate to the drive sheave 38 toward the water with the opening facing the water. The rear longline guide 114 may guide the longline 18 back into the water.

The mechanized collector 10 may include a shaker assembly 24, as shown in FIGS. 2-5, 8, 10 and 20, positioned to engage one or more of the plurality of juvenile lobster collectors 20 suspended above the deck 22 of the vessel 14 and attached to the longline 18. The shaker assembly 24 may rapidly move a juvenile lobster collector 20 back and forth to shake the juvenile lobsters from the marine fouling on the juvenile lobster collectors 20. In at least one embodiment, the shaker assembly 24 may be configured to shake the juvenile lobster collectors 20 one at a time to prevent lobsters from being shaken from other collectors 20 that are not positioned over the collection trough 25. The juvenile lobster collectors 20 are not cages or traps; rather, the juvenile lobster collectors 20 are devices that provide areas for marine fouling to occur, which in turn attracts the juvenile lobsters as a food source and as shelter. The shaker assembly 24 may easily and quickly shake the juvenile lobsters from the juvenile lobster collectors 20 to fall into the collection trough 25 that is positioned near the deck 22 by simply grasping and shaking the juvenile lobsters collectors 20. The shaker assembly 24 may be configured to apply acceleration and jerk loads to the juvenile lobster collector 20 to dislodge the juvenile lobsters without harming the juvenile lobsters.

Figure 4:
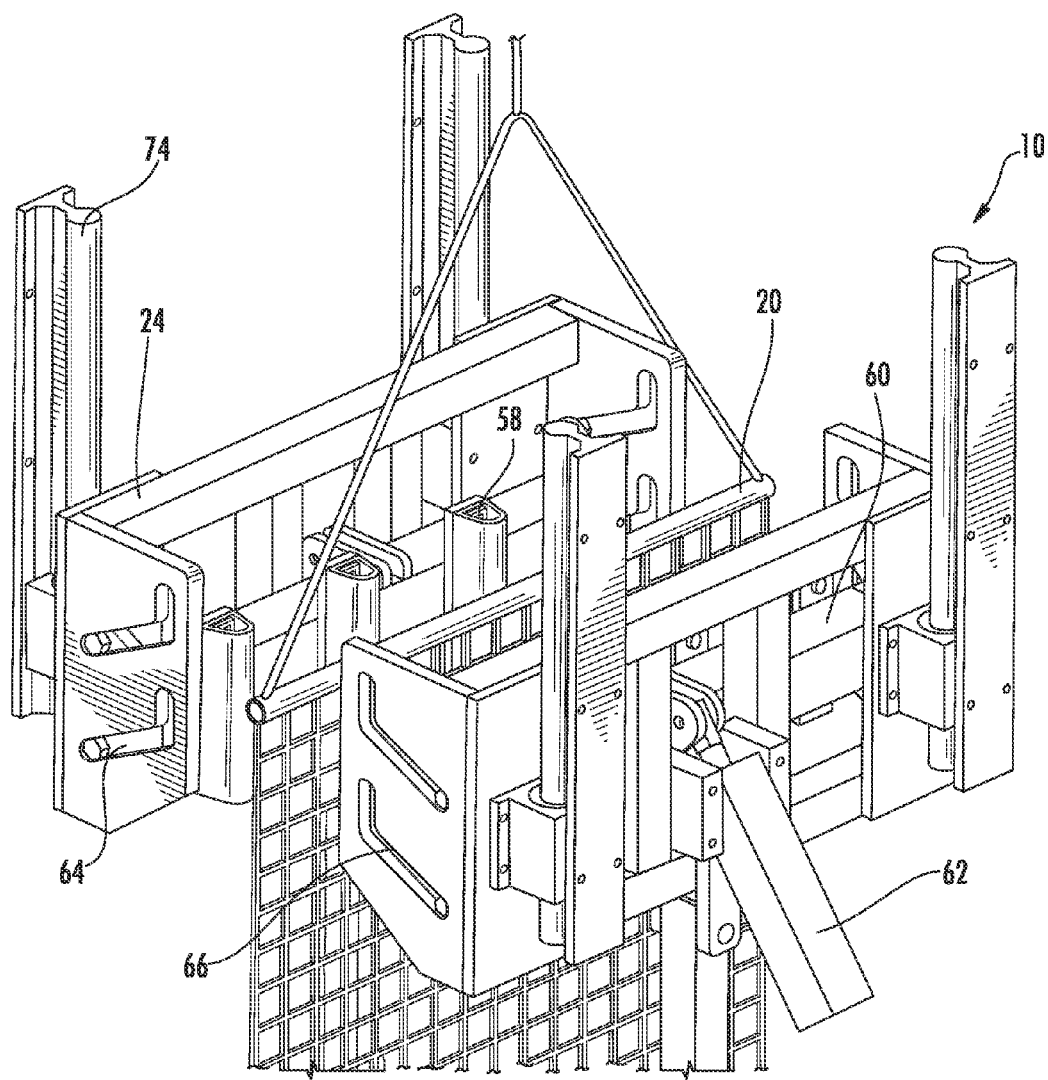
FIG. 4 is a detailed perspective view of the shaker assembly with the clamp frames in an open position to accept the juvenile lobster collector.
Figure 5:
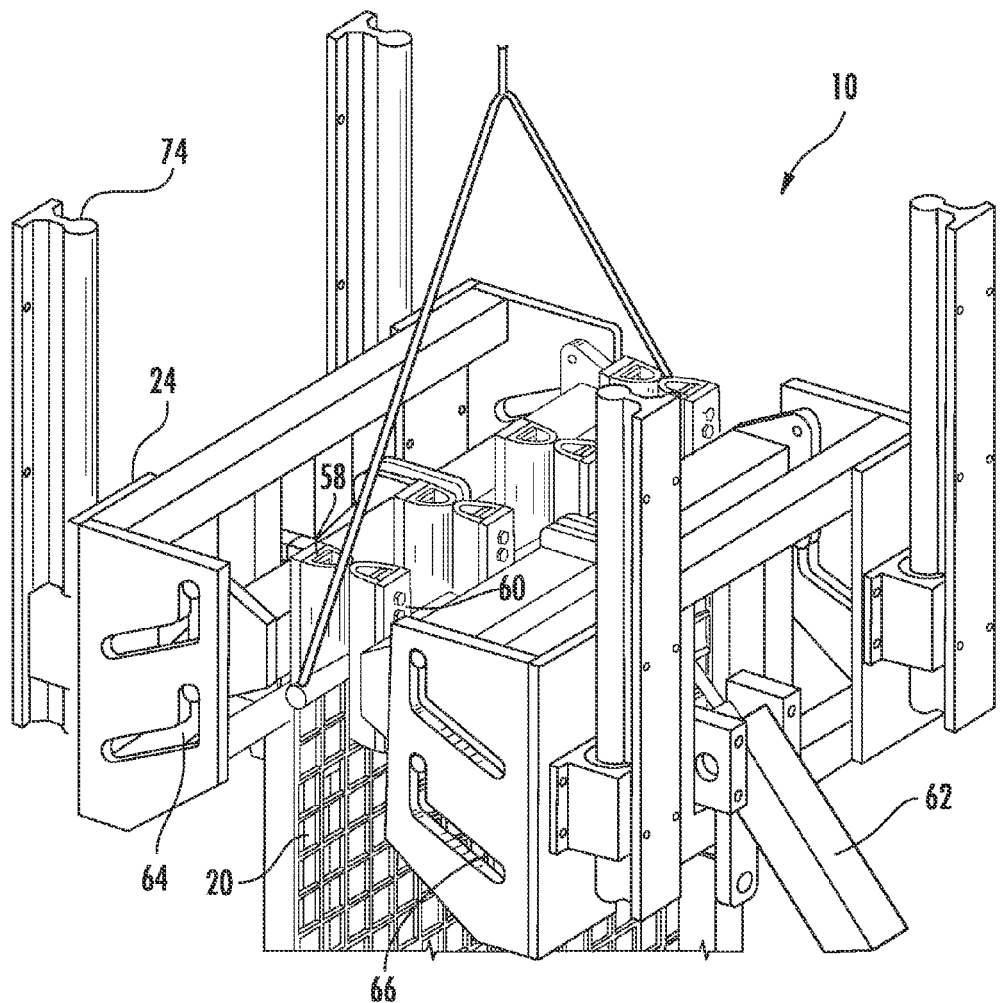
FIG. 5 is a detailed perspective view of the shaker assembly with the clamp frames in a closed position in which the clamp frames engage the juvenile lobster collector.

The shaker assembly 24 may be formed from a frame 56 having first and second clamp frames 58, 60. The shaker assembly 24 may be configured to tightly secure the juvenile lobster collectors 20 so that the collectors do not slip, to lift the juvenile collectors 20 a distance to relieve tension from the line attaching the juvenile collectors 20 to the longline 18 and to shake the juvenile lobster collectors 20 to remove the juvenile lobsters. The clamp frames 58, 60 may include clamp bars 116, 118, which may be made of a flexible material, such as rubber or other appropriate material, to contact the juvenile lobster collectors 20. The clamp frames 58, 60 may be constructed such that one or both of the clamp frames 58, 60 may move towards each other to reduce the distance between the clamp frames 58, 60 to grasp the juvenile lobster collector 20, as shown in FIGS. 4 and 5. A hydraulic cylinder 62 may be used to push the clamp bars 116, 118 along slots 64, 66 to engage the juvenile lobster collector 20.

The shaker assembly 24 may include a crankshaft 68 and crankshaft arm 70, as shown in FIG. 3, for moving the clamp frames 58, 60 vertically in a reciprocating motion. The crankshaft 68 and crankshaft arm 70 may be configured to move the juvenile lobster collector 20 a distance of between about five inches and about fourteen inches, and in one embodiment, about twelve inches in a generally vertical direction along the vertically positioned shafts 74. The shafts 74 may be positioned generally vertically on the frame 56 of the shaker assembly 24 and formed from any appropriate material. The crankshaft 68 may be rotated at any appropriate rate sufficient to shake the juvenile lobsters from the juvenile lobster collector 20. In one embodiment, the crankshaft 68 may be rotated at a rate of about two cycles per second. In other embodiments, the crankshaft 68 may be rotated at other rates of rotation. The rate of rotation and the corresponding rate of shaking may be varied with a controller on the control panel.

Figure 10:
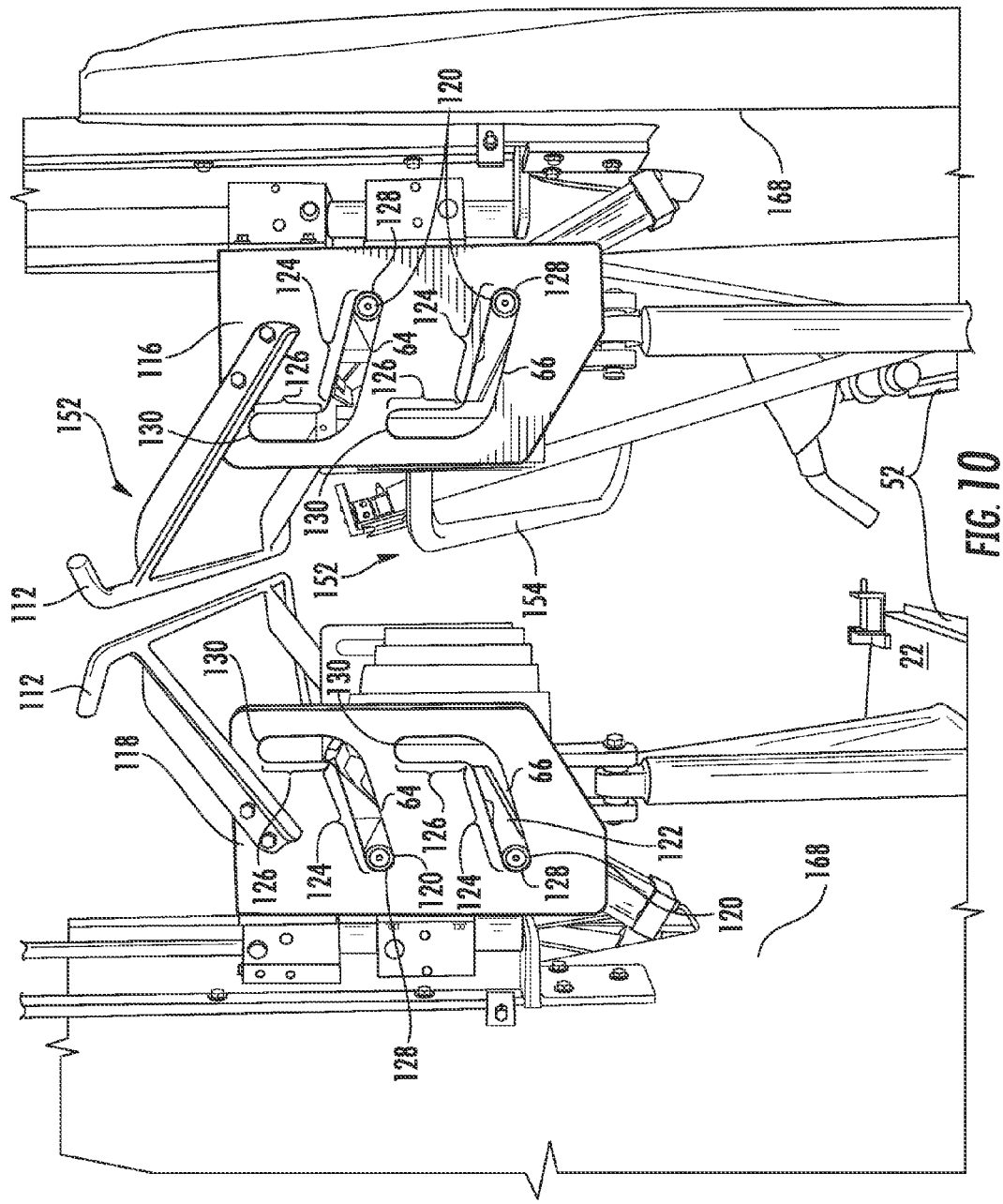
FIG. 10 is a perspective view of the shaker assembly.

The clamp bars 116, 118, as shown in FIG. 10, may be slideably coupled to the clamp frames 58, 60 such that one or more studs 120 protruding from sides 122 of the clamp bars 116, 118 is positioned within slots 64, 66 in the clamp frame 58, 60. A slot 64, 66 may be formed from a first engaging section 124 that is positioned generally oblique to the deck 22 of the vessel 14 and a second engaged section 126 that is positioned generally vertically such that when the clamp bar 116, 118 engages one of the juvenile lobster collectors 20, the stud 120 slides from a first end 128 of the first engaging section 124 to an intersection of the first engaging section 124 and the second engaging section 126, thereby engaging the juvenile lobster collector 20 and moving from the intersection to a second end 130 of the second engaging section 126 thereby moving the juvenile lobster collector 20 vertically and alleviating weight from the bridle 29 securing the juvenile lobster collector 20 to the longline 18.

The two opposing clamp frames 58, 60 may be slideably attached to generally vertically positioned shafts 74. The clamp bars 116, 118 may be attached to each of the clamp frames 58, 60 such that the one or more studs 120 protruding from sides of the clamp bars 58, 60 is positioned within the slot 64, 66 in the clamp frame 58, 60 enabling the clamp bar 116, 118 to move relative to the clamp frame 58, 60. Each of the clamp frames 58, 60 may be coupled to a drive shaft 68 through a yoke 150 positioned beneath a collection trough 25 with arms extending above the collection trough 25 and a cam 132 to create a generally vertical reciprocating motion.

The mechanized collector 10 may include a guide system 152, as shown in FIG. 10, configured to guide the bridles 29 attaching the juvenile lobster collectors 20 onto the longline 18 laterally away from the longline 18 positioned in the longline support system 16 such that the bridles 29 are not pulled through sheaves 38, 44, 108, 110 of the longline support system 16. The guide system 152 may include the bridle guide rail 86 attached to the frame 84 supporting the front sheave assembly 78, the bow longline guide 50 positioned at the bow of the vessel 14, a sheave tree bridle guide rail 112 attached to the support frame 106 supporting the adjustable sheave tree 80, a hauler bridle guard rail 48 positioned below the drive sheave 38, and a rear longline guide 114 extending from proximate the drive sheave 38 to a location proximate to the deck 22 of the vessel 14. In addition, a bow guide rail 154, as shown at least in FIGS. 8 and 10, may extend from the frame 84 supporting the front sheave assembly 78 to the shaker assembly 24 to guide the collectors 20 to the shaker assembly 78. The bow guide rail 154 may have any appropriate configuration and, in at least one embodiment, may be formed from an elongated member having sufficient strength to extend unsupported between the frames. As collectors 20 contact components of the guide system 152 moves, the collectors 20 are typically moved laterally relative to the longline 18 to prevent the bridles 29 from catching in the sheaves 38, 44, 108, 110. As such, the longline 18 is able to pass though the length of the vessel 14 without the bridles 29 catching in the sheaves 38, 44, 108, 110.

Figure 12:
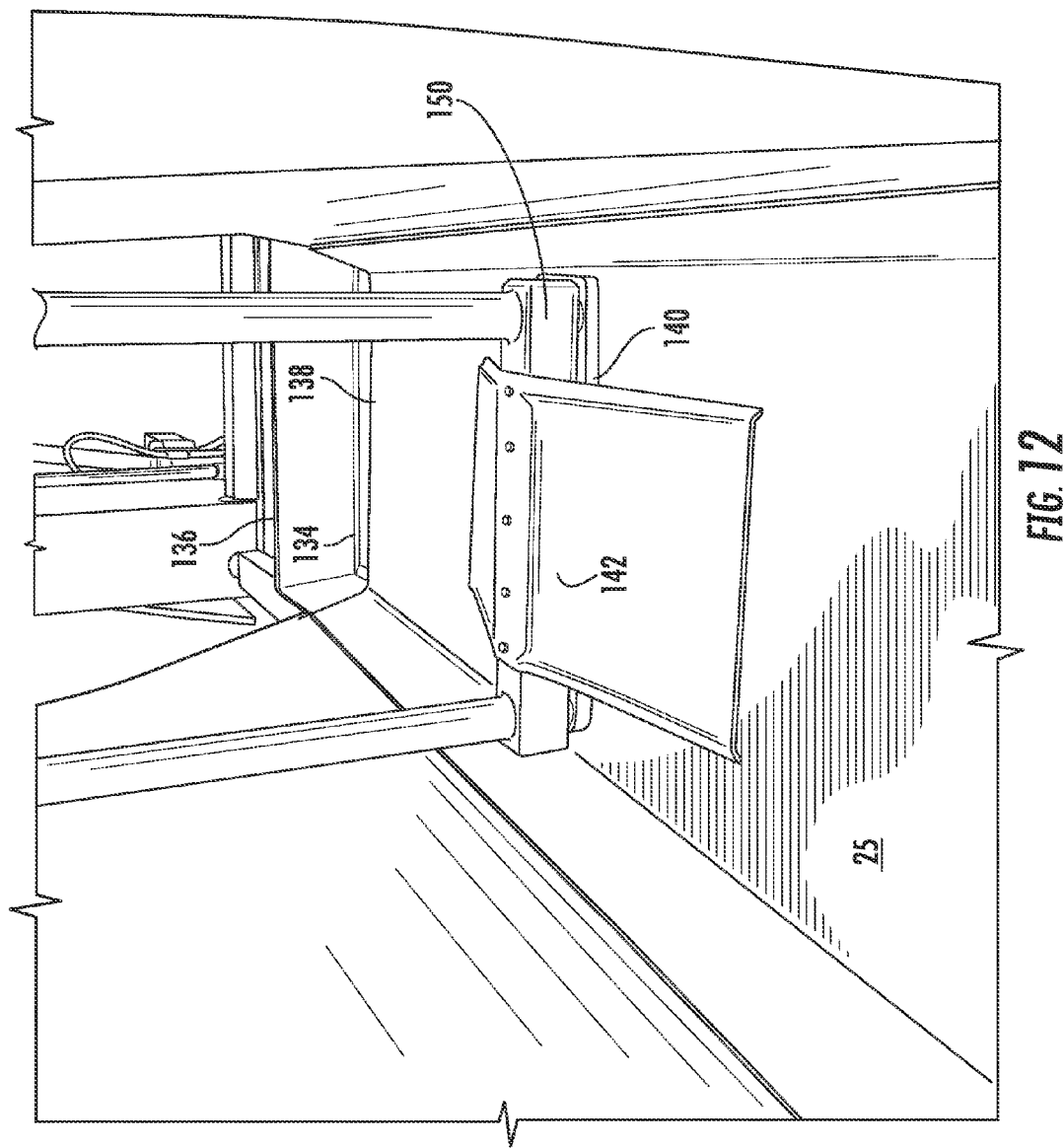
FIG. 12 is a perspective view of a collection trough positioned beneath the shaker assembly.
Figure 13:
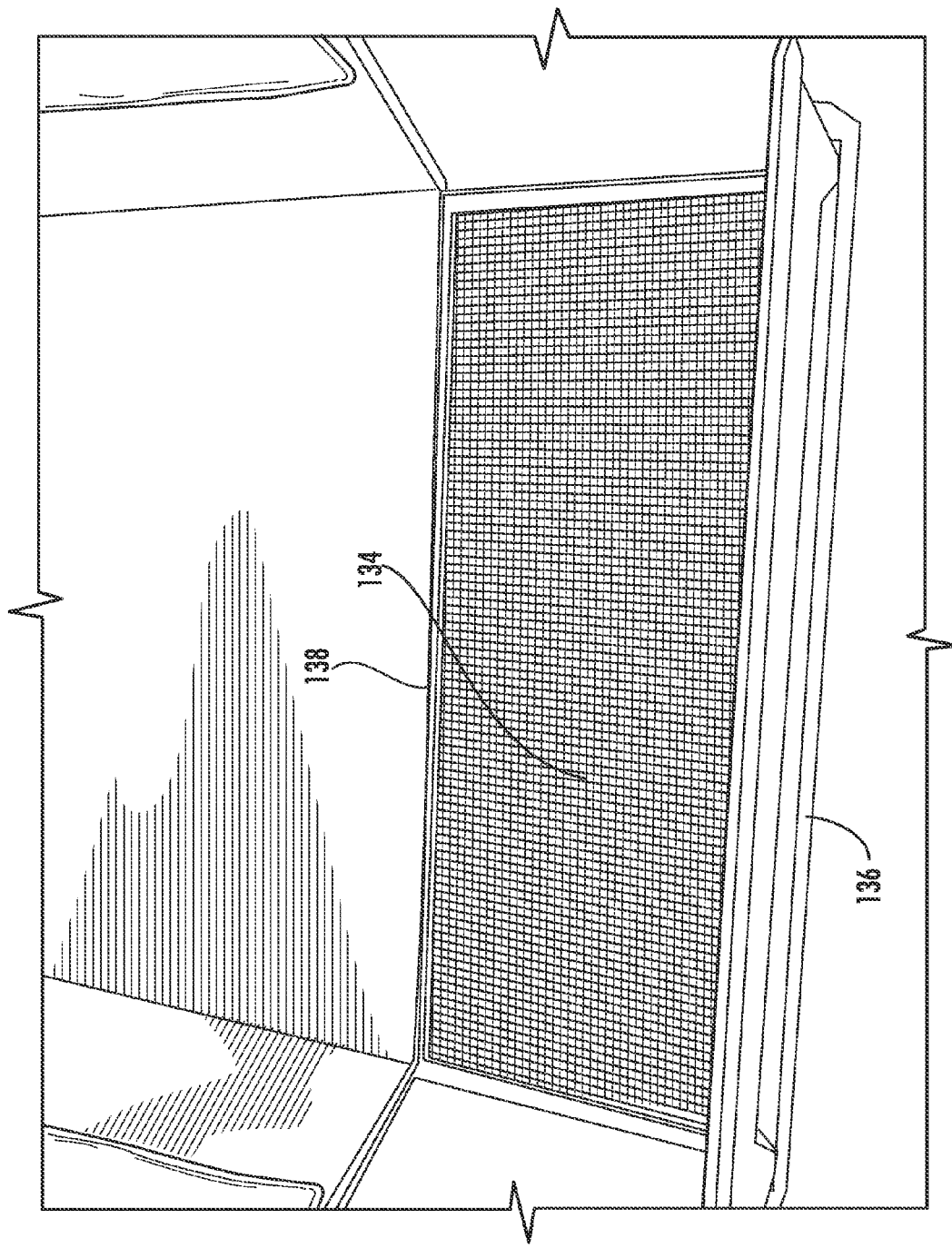
FIG. 13 is a perspective view of a collection screen positioned over a drainage pan at a downstream end of the collection trough.

The mechanized collector 10 may include a collection trough 25, as shown in FIGS. 12 and 13, positioned under at least a portion of the shaker assembly 24 to collect lobsters falling from the juvenile lobster collectors 20. A collection screen 134 may be positioned over a drainage pan 136 positioned at a downstream end 138 of the collection trough 25. The screen 134 may be sized to capture lobster, aquatic growth and the like while allowing water to pass through the screen 134. The trough 25 may include a center recess 140 housing drive shaft components. The center recess 140 may be covered with a recess cover 142 that is coupled to a yoke 150 to prevent water and particles from falling out of the trough 25. The collection trough 25 may include a washdown system 166 for spraying down the equipment and removing the collected debris from the collection trough 25. The washdown system 166 may include a pump attached to an overboard water pickup. The washdown system 166 may also be used to spray the curtains 168 that extend generally vertically on the sides of the collection trough 25 upwardly toward the adjustable sheave tree 80 on either side of the shaker assembly 24. The curtains 168 deflect collected debris that may be scattered during the shaking process.

The mechanized collector 10 may include a helm 156 with controls for operating the outboard engines 76, with a communications device, such as a VHF marine radio, navigation lights, batteries, battery switches, fire extinguishers and other such equipment. A control station 156 may include controls, such as, but not limited to, a haul control 158, a clamp control 160, and a shake control 162. The controls 158, 160, 162 control various components driven by the HPU 40. The haul control 158 controls the drive sheave 38 with forward and reverse. The clamp control 160 controls the clamping of the collectors 20. The shake control 162 is configured such that after the control is released, the clamp frames 58, 60 are returned to a bottom, starting position. A valve handle 164 may be positioned on the control station 156 to control the speed of the shaker assembly 24.

Figure 16:
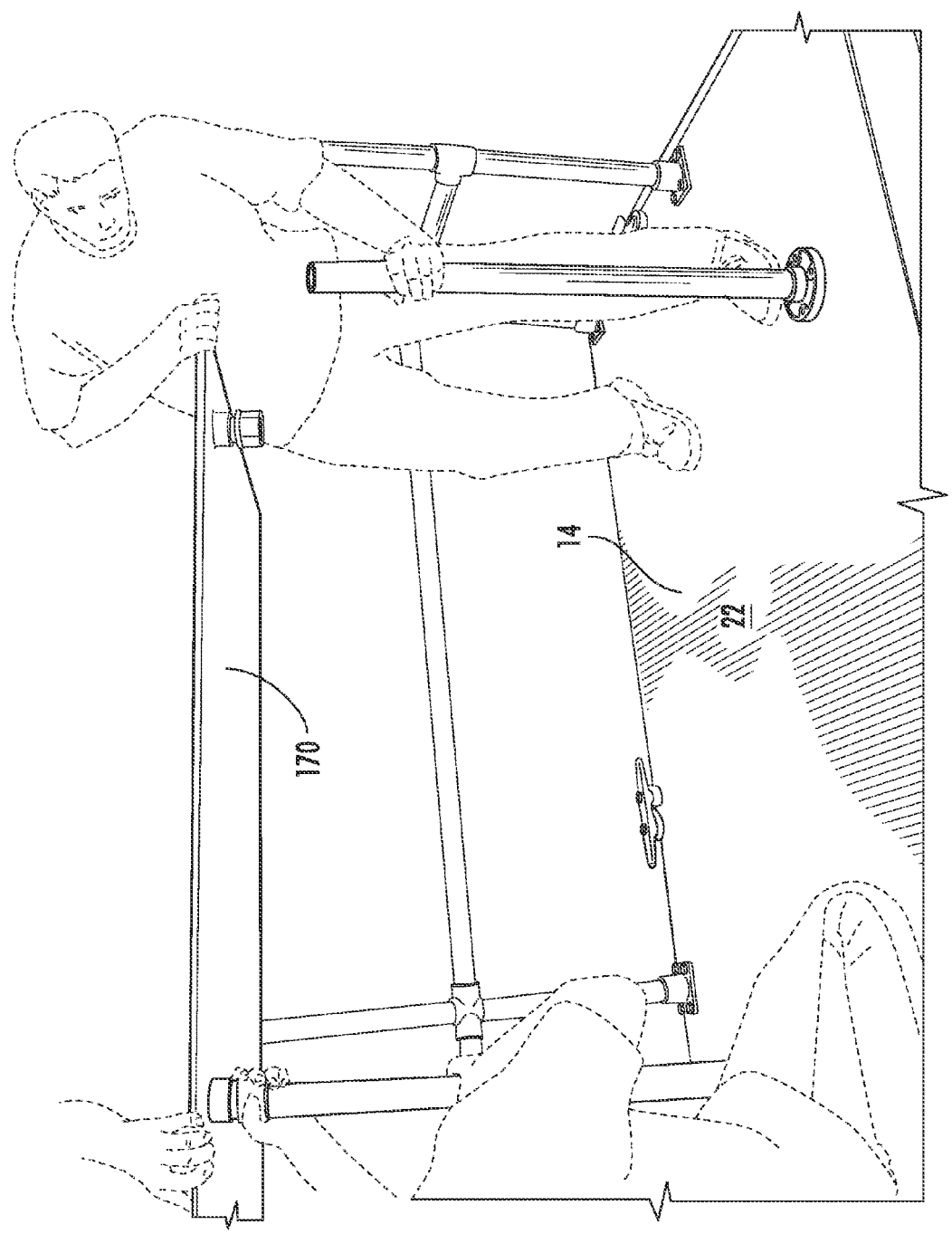
FIG. 16 is a perspective view of a table top being moved from the bow recess to form a table to use during harvesting operations.

The mechanized collector 10 may be a component of a method of raising lobsters for human consumption. In particular, the method may include collecting juvenile lobsters using a mechanized collector 10 as previously described. The mechanized collector 10 may include the vessel 14, the longline support system 16, and the shaker assembly 24 positioned to engage at least one of the plurality of juvenile lobster collectors 20 suspended above the deck 22 of the vessel 14. The juvenile lobster collectors 20 are moved into the mechanized collector 10 by first opening the bow recess 52. A metal plate 170 may be removed to open the bow recess 52. The metal plate 170 may be moved to another are of the bow to form a processing table 170, as shown in FIG. 16. The bow longline guide 50 may be moved into an open position, and the longline 18 may be moved into the bow recess 52.

Figure 11:
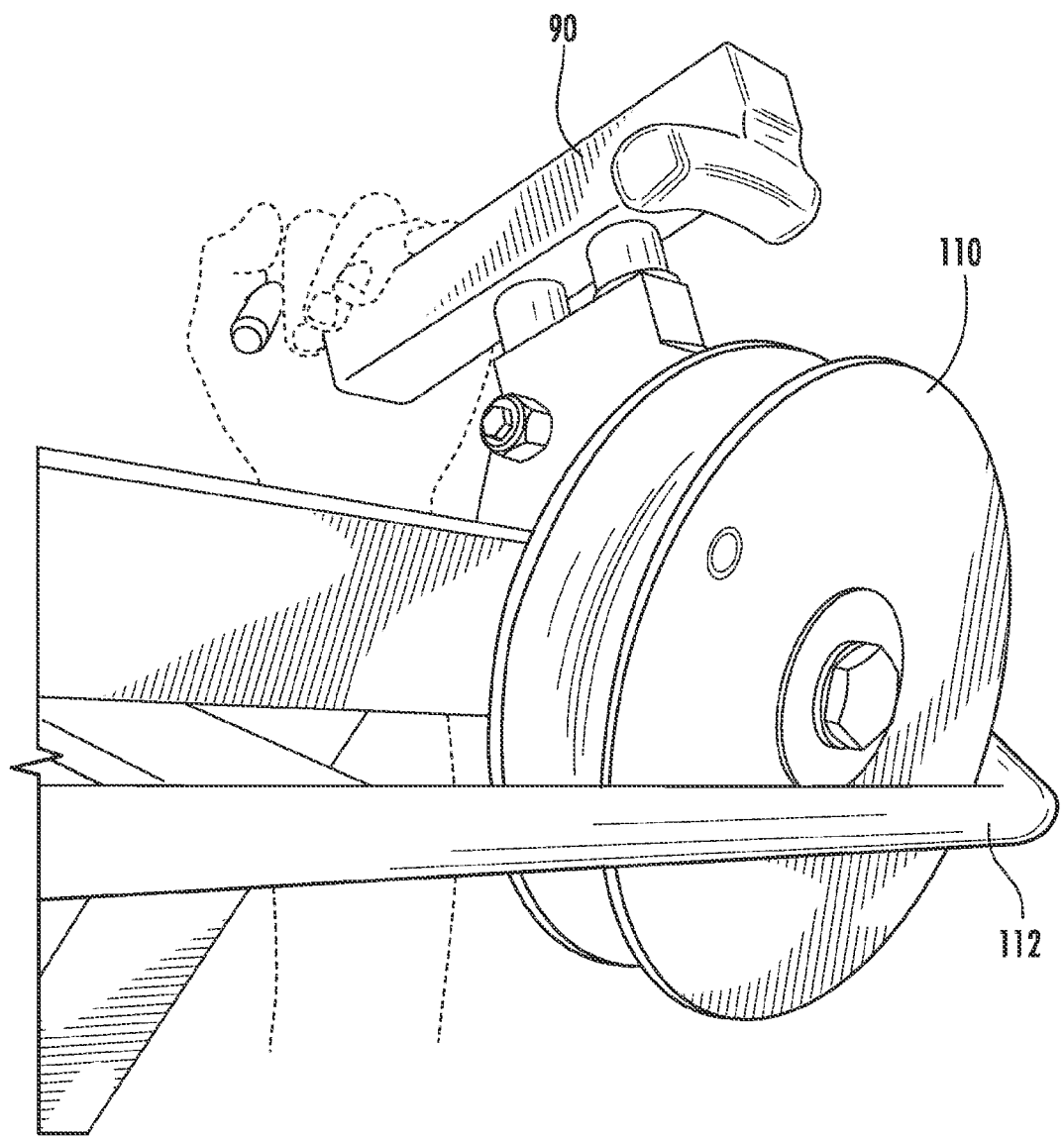
FIG. 11 is a perspective view of the aft sheave of the adjustable sheave tree with a sheave keeper being moved between open and closed positions.

The mechanized collector 10 may be operated to collect juvenile lobsters by first attaching the longline 18 to the longline support system 16, as shown in FIG. 23. The longline 18 may be attached by first releasing some tension on the longline 18. The longline 18 may be feed through the first front sheave 44, the forward sheave 108 and aft sheave 110 of the adjustable sheave tree 80 over the shaker assembly 24, the drive sheave 38, and the rear longline guide 114. The sheave keepers 90, as shown in FIG. 11, may be opened to enable the longline 18 to be placed into the sheaves 38, 44, 108, 110. The longline 18 may be placed into the sheaves 38, 44, 108, 110 and secured therein. The bow longline guide 50, as shown in FIG. 19, and the rear longline guide 114 increase the contact area of the longline 18 on the first front sheave 44 and the drive sheave 38, respectively. The hydraulic power unit 40 (HPU), as shown in FIGS. 1 and 14, may be activated to rotate the drive sheave 38 to pull a juvenile lobster collector 20 from the water. The haul control 158 may then be activated to pull the vessel 14 relative to the longline 18. The haul control 158 is activated until a juvenile lobster collector 20 is positioned between the clamp bars 116, 118.

When in the water, the longline 18 rests below the juvenile lobster collector 20 such that the juvenile lobster collector 20 rises above the longline 18 and is suspended beneath the float 28. As the juvenile lobster collector 20 hangs from the float 28, the juvenile lobster collector 20 is suspended below the longline 18, as shown in FIG. 1. Once positioned between the clamp bars 116, 118, the drive sheave 38 is stopped with the haul control 158 and the clamp bars 116, 118 are activated to clamp onto the juvenile lobster collector 20.

The shaker assembly 24, as shown in FIGS. 2-5, 8 and 10, operates by first and second clamp bars 116, 118 moving toward each other and contacting the juvenile lobster collector 20 therebetween. The first and second clamp bars 116, 118 may move along the first and second slots 64, 66 to engage the juvenile lobster collector 20. The first and second clamp bars 116, 118 may then move upward along the shafts 74 a distance, such as about two to five inches, sufficient to relieve tension from the rope attaching the juvenile lobster collector 20 to the longline 18. Movement of the clamp bars 116, 118 may be activated with the clamp control 160, shown in FIG. 15. The collector 20 may be shaken by activating the shaker assembly 24 using the shake control 160, as shown in FIG. 20. The collector 20 is shaken by rotating the crankshaft 68 to create a reciprocating motion of the juvenile lobster collector 20 at a rate sufficient to shake the juvenile lobsters from the juvenile lobster collectors 20. The juvenile lobster collector 20 may be shaken at a rate of more than two cycles per second for five to six seconds. The first and second clamp frames 58, 60 may then be retracted and the longline 18 may be advanced until the next juvenile lobster collector 20 is positioned within the shaker assembly 24.

Figure 21:
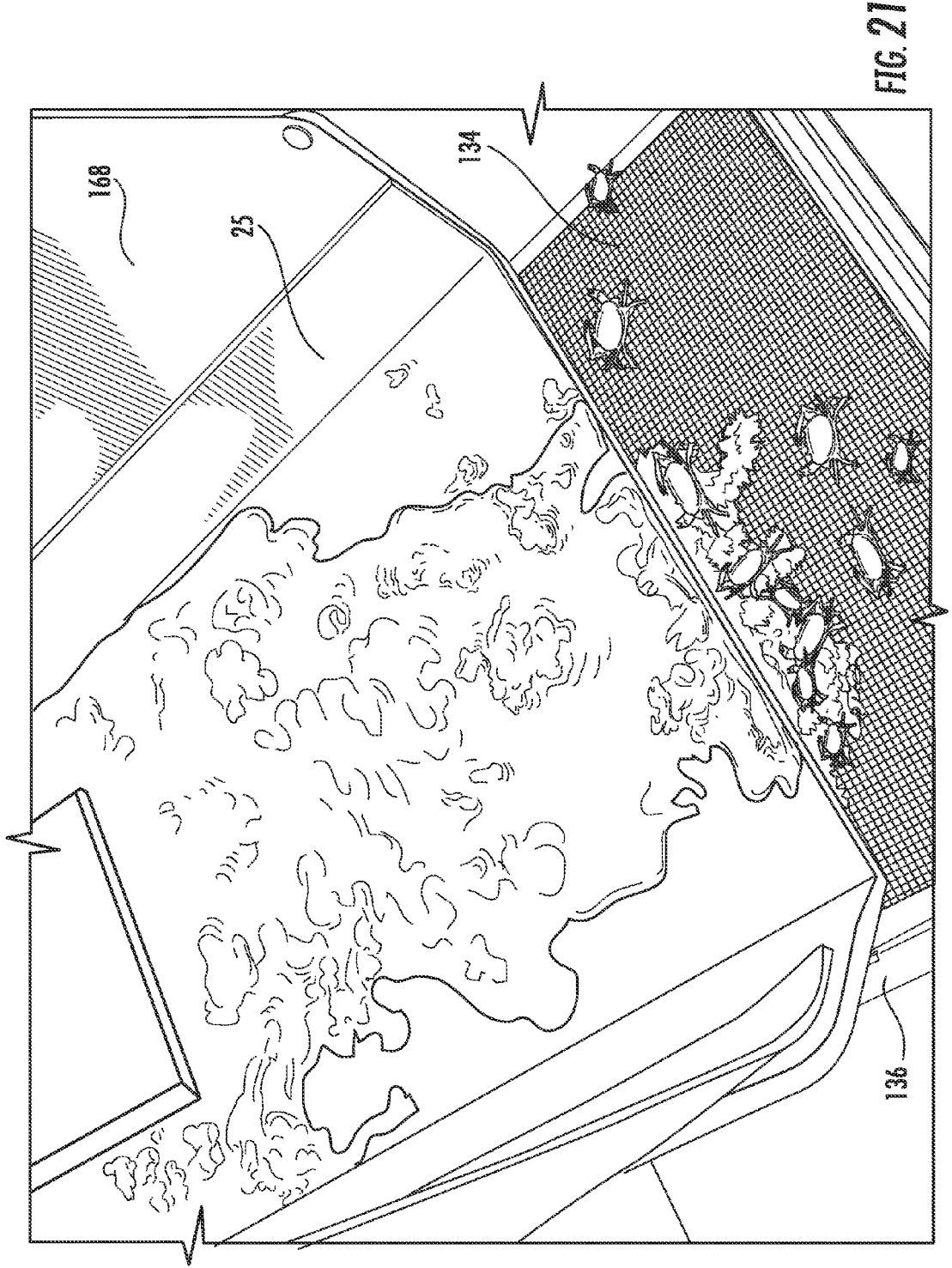
FIG. 21 is a perspective view of the collection trough after a collector has been shaken.
Figure 22:
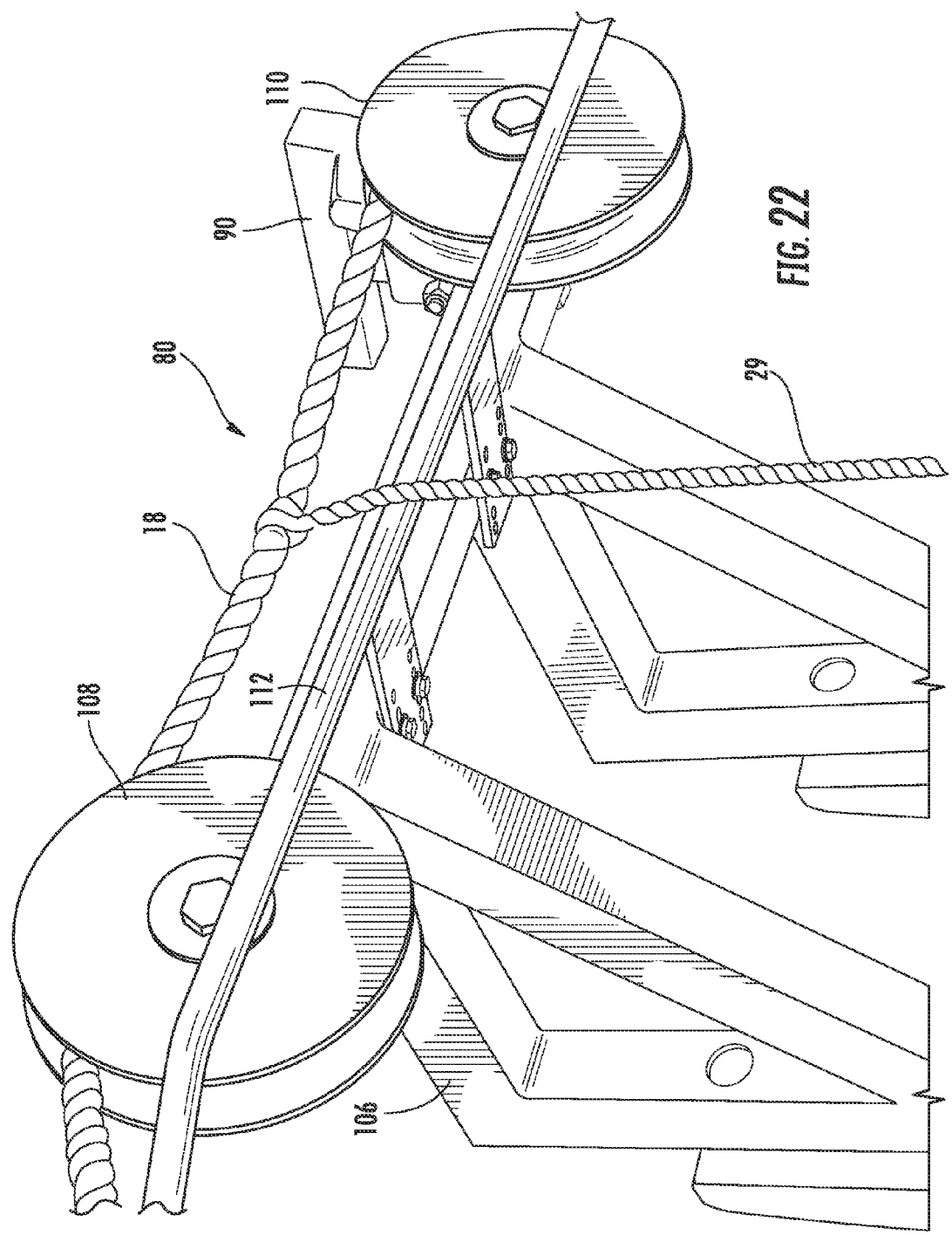
FIG. 22 is a perspective view of the adjustable sheave tree with a longline positioned in the forward and aft sheaves and a bridle extending from the longline.

The juvenile lobsters are shaken from the collector 20 and collect in the collection trough 25, as shown in FIG. 21. The collection screen 134 at the downstream end 138 of the collection trough 25 may be placed onto a sorting table and the contents sorted out. The juvenile lobsters may be separated from other debris and stored in a cooler under the table. This method may be repeated for each of the juvenile lobster collectors 20 that are attached to the longline 18. Once a collector 20 has been shaken, the clamp control 160 may be moved to a resting position to release the collector 20. The hydraulic power unit 40 and the drive sheave 38 may be activated using the haul control 158 to pull the vessel 14 along the longline 18 while the longline 18 remains attached to the bottom. The system may be controlled manually by actuating each component or, in other embodiments, by automation of portions or all of the system.

Figure 6:
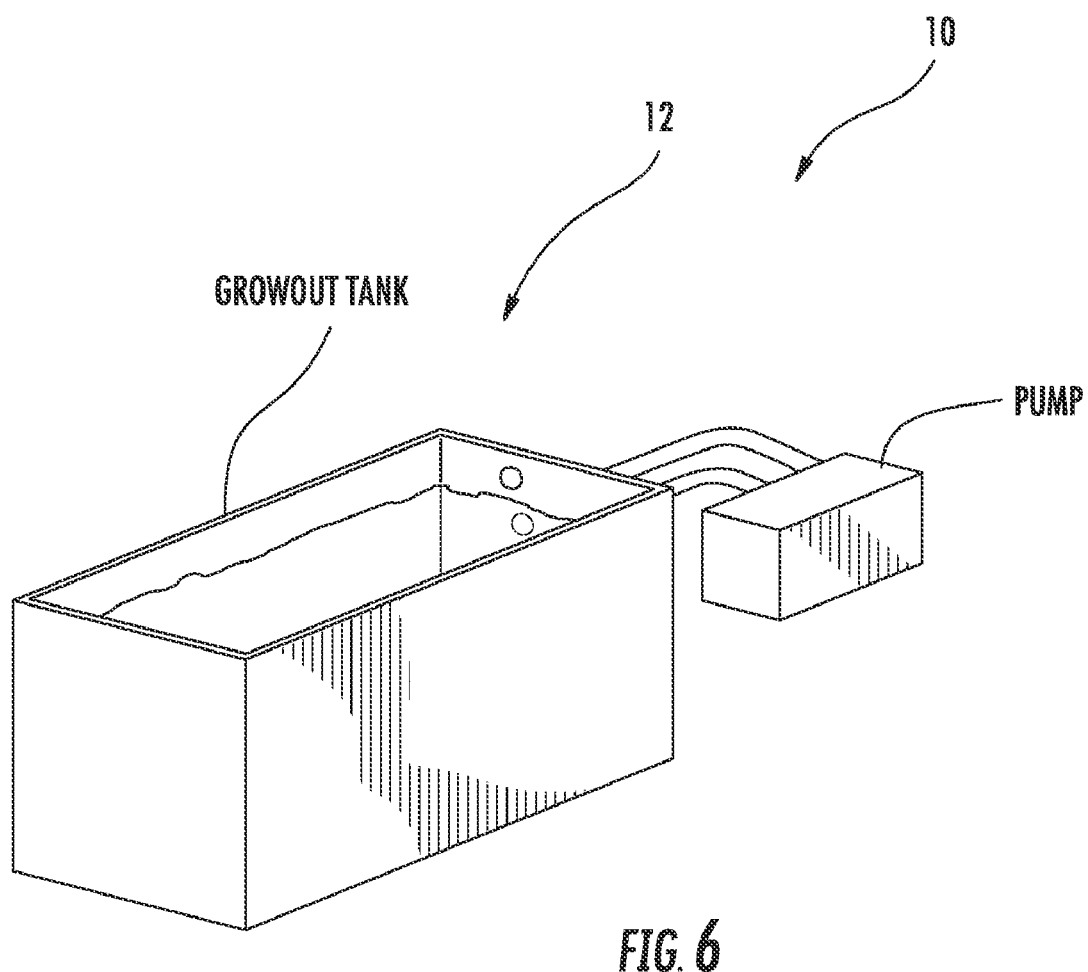
FIG. 6 is a schematic diagram of a growout system.

The lobsters that are collected from the juvenile lobster collectors 20 may be placed into a growout system 12, as shown in FIG. 6. The growout system 12 may be any appropriate device, such as, but not limited to, a growout system in a naturally occurring water body, such as sea cages, or in a tank on land, such as inland growout systems. The lobsters may be retained in the growout system 12 until the lobster reach a harvestable size. The harvestable size may vary depending on the desired end use of the lobster tail and controlling regulations. The lobsters may be grown using any appropriate method. The lobsters may then be harvested and shipped to their final destination to be prepared for consumption.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A mechanized collector for juvenile lobsters, comprising:
   a vessel;
   a longline support system capable of supporting and suspending a longline having a plurality of juvenile lobster collectors above a deck of the vessel;
   a shaker assembly positioned proximate to the longline support system to engage at least one of the plurality of juvenile lobster collectors suspended above the deck of the vessel and attached to the longline;
   wherein the longline support system is formed from a front sheave assembly positioned forward on the vessel relative to the shaker assembly, an adjustable sheave tree assembly positioned above the shaker assembly, and a hauler assembly positioned aft of the shaker assembly;
   wherein the adjustable sheave tree assembly is formed from a support frame having a forward sheave and an aft sheave that are generally aligned, and
   a sheave tree bridle guide rail attached to the support frame and extending laterally from the support frame past a longitudinal axis of the longline support system to deflect the juvenile lobster collectors out of the longitudinal axis of the longline support system so as to prevent fouling of juvenile lobster collector bridles with the forward and aft sheaves;
   wherein the support frame is adjustably coupled to the shaker assembly such that the distance of the forward and aft shaves from the deck of the vessel may be varied.

2. The mechanized collector of claim 1, wherein the front sheave assembly is formed from a sheave supported above the deck of the vessel by a frame, a bridle guide rail attached to the frame and extending laterally from the frame past a longitudinal axis of the longline support system to deflect the juvenile lobster collectors out of the longitudinal axis of the longline support system so as to prevent fouling of juvenile lobster collectors bridles with the sheave, and a sheave keeper positioned proximate to the sheave to prevent the longline from being displaced from the sheave.

3. The mechanized collector of claim 1, wherein the hauler assembly comprises a drive sheave supported above the deck of the vessel by a hauler frame, a motor with a brake coupled to the sheave, a hauler bridle guard rail attached to the hauler frame and extending laterally from the support frame past a longitudinal axis of the longline support system to deflect the juvenile lobster collectors out of the longitudinal axis of the longline support system so as to prevent fouling of juvenile lobster collector bridles with the drive sheave, and a rear longline guide extending from proximate the drive sheave to a location proximate to the deck of the vessel.

4. The mechanized collector of claim 1, further comprising a bow guide rail extending from the front sheave assembly to the shaker assembly to guide the juvenile lobster collectors, wherein the bow guide rail is generally aligned with a longitudinal axis of the longline support system.

5. The mechanized collector of claim 1, further comprising a bow longline guide positioned at the bow of the vessel and configured to guide the longline onto a front sheave.

6. The mechanized collector of claim 5, wherein the bow longline guide comprises a rotatable boom that rotates open to provide an opening to the juvenile lobster collector basin at the bow of the vessel, wherein the rotatable boom is positioned forward of the front sheave and includes a chute forming a longline containment channel extending from proximate a water surface and curving upwardly toward the shaker assembly.

7. The mechanized collector of claim 5, wherein the chute is formed from at least one deflection panel forming transition sides that are positioned at oblique angles relative to each other.

8. The mechanized collector of claim 1, further comprising a guide system configured to guide the juvenile lobster collector bridles attaching the juvenile lobster collectors onto the longline laterally away from the longline positioned in the longline support system such that the bridles are not pulled through sheaves of the longline support system.

9. The mechanized collector of claim 1, further comprising a collection trough positioned under at least a portion of the shaker assembly to collect lobsters falling from the juvenile lobster collectors and a collection screen positioned over a drainage pan positioned at a downstream end of the collection trough.

10. The mechanized collector of claim 9, wherein the trough includes a center recess housing drive shaft components, wherein the center recess is covered with a recess cover that is coupled to a yoke to prevent water and particles from falling out of the trough.

11. The mechanized collector of claim 1, further comprising at least one outboard, marine engine for propelling the vessel.

12. The mechanized collector of claim 1, wherein the juvenile lobster collector is formed from at least one panel attached to the longline, wherein the at least one panel is formed from a generally flat panel suspended generally vertically in water above the longline with at least one float.

13. The mechanized collector of claim 1, comprising a hydraulic control console that includes a shake control for controlling reciprocating shaking by the shaker assembly, a clamp control for controlling clamping of a juvenile lobster collector, and a longline haul control for controlling a motor coupled to a drive sheave.

14. A mechanized collector for juvenile lobsters, comprising:
a vessel;
a longline support system capable of supporting and suspending a longline having a plurality of juvenile lobster collectors above a deck of the vessel;
a shaker assembly positioned proximate to the longline support system to engage at least one of the plurality of juvenile lobster collectors suspended above the deck of the vessel and attached to the longline;
wherein the shaker assembly is formed from at least one clamp bar slideably coupled to a clamp frame such that at least one stud protruding from a side of the clamp bar is positioned within a slot in the clamp frame; and
wherein the slot is formed from a first engaging section that is positioned generally oblique to the deck of the vessel and a second engaged section that is positioned generally vertically such that when the clamp bar engages one of the juvenile lobster collectors, the at least one stud slides from a first end of the first engaging section to an intersection of the first engaging section and the second engaging section, thereby engaging the juvenile lobster collector, and moving from the intersection to a second end of the second engaging section thereby moving the juvenile lobster collector vertically and alleviating weight from a bridle securing the juvenile lobster collector to the longline.

15. A mechanized collector for juvenile lobsters, comprising:
a vessel;
a longline support system capable of supporting and suspending a longline having a plurality of juvenile lobster collectors above a deck of the vessel;
a shaker assembly positioned proximate to the longline support system to engage at least one of the plurality of juvenile lobster collectors suspended above the deck of the vessel and attached to the longline;
wherein the shaker assembly comprises two opposing clamp frames slideably attached to generally vertically positioned shafts and at least one clamp bar attached to each of the clamp frames such that at least one stud protruding from a side of the at least one clamp bar is positioned within a slot in the clamp frame enabling the clamp bar to move relative to the clamp frame.

16. The mechanized collector of claim 15, wherein each of the clamp frames is coupled to a drive shaft through a yoke positioned beneath a collection trough and a cam to create a generally vertical reciprocating motion.

17. A method of preparing lobsters for human consumption, comprising:
collecting juvenile lobsters using a mechanized collector comprising:
a vessel;
a longline support system capable of supporting and suspending a longline having a plurality of juvenile lobster collectors above a deck of the vessel; and
a shaker assembly positioned proximate to the longline support system to engage at least one of the plurality of juvenile lobster collectors suspended above the deck of the vessel and attached to the longline;
wherein the shaker assembly comprises two opposing clamp frames slideably attached to generally vertically positioned shafts and at least one clamp bar attached to each of the clamp frames such that at least one stud protruding from a side of the at least one clamp bar is positioned within a slot in the clamp frame enabling the clamp bar to move relative to the clamp frame;
placing the lobsters in a growout system;
growing the lobsters in the growout system until the lobsters reach a harvestable size; and
harvesting the lobsters.

18. The method of claim 17, wherein collecting juvenile lobsters using a mechanized collector comprises collecting juvenile lobsters with a vessel wherein the longline support system is formed from a front sheave assembly positioned forward on the vessel relative to the shaker assembly, an adjustable sheave tree assembly positioned above the shaker assembly, a hauler assembly positioned aft of the shaker assembly, a bow guide rail extending from the front sheave assembly to the shaker assembly to guide the juvenile lobster collectors, wherein the bow guide rail is generally aligned with a longitudinal axis of the longline support system, and a guide system configured to guide the bridles attaching the juvenile lobster collectors onto the longline laterally away from the longline positioned in the longline support system such that the bridles are not pulled through sheaves of the longline support system.

19. A method of preparing lobsters for human consumption, comprising:
 collecting juvenile lobsters using a mechanized collector comprising:
  a vessel;
  a longline support system capable of supporting and suspending a longline having a plurality of juvenile lobster collectors above a deck of the vessel; and
  a shaker assembly positioned proximate to the longline support system to engage at least one of the plurality of juvenile lobster collectors suspended above the deck of the vessel and attached to the longline;
  wherein the shaker assembly is formed from at least one clamp bar slideably coupled to a clamp frame such that a least one stud protruding from a side of the clamp bar is positioned within a slot in the clamp frame; and
  wherein the slot is formed from a first engaging section that is positioned generally oblique to the deck of the vessel and a second engaged section that is positioned generally vertically such that when the clamp bar engages one of the juvenile lobster collectors, the at least one stud slides from an first end of the first engaging section to an intersection of the first engaging section and the second engaging section, thereby engaging the juvenile lobster collector, and moving from the intersection to a second end of the second engaging section thereby moving the juvenile lobster collector vertically and alleviating weight from a bridle securing the juvenile lobster collector to the longline;
 placing the lobsters in a growout system;
 growing the lobsters in the growout system until the lobsters reach a harvestable size; and
 harvesting the lobsters.

* * * * *